(12) United States Patent
Coulter

(10) Patent No.: US 11,472,080 B2
(45) Date of Patent: Oct. 18, 2022

(54) SHEAR-INDUCING INJECTION MOLDING SYSTEM

(71) Applicant: Lehigh University, Bethlehem, PA (US)

(72) Inventor: John P. Coulter, Schnecksville, PA (US)

(73) Assignee: Lehigh University

( * ) Notice: Subject to any disclaimer, the term of this patent is extended or adjusted under 35 U.S.C. 154(b) by 0 days.

(21) Appl. No.: 17/342,621

(22) Filed: Jun. 9, 2021

(65) Prior Publication Data

US 2021/0379805 A1 Dec. 9, 2021

Related U.S. Application Data

(60) Provisional application No. 63/036,909, filed on Jun. 9, 2020, provisional application No. 63/093,908, filed on Oct. 20, 2020.

(51) Int. Cl.
*B29C 45/28* (2006.01)

(52) U.S. Cl.
CPC ................. *B29C 45/2806* (2013.01)

(58) Field of Classification Search
CPC ............... B29C 45/2806; B29C 2045/0098
See application file for complete search history.

(56) References Cited

U.S. PATENT DOCUMENTS 6,824,379 B2 11/2004 Doyle et al.
8,016,581 B2 9/2011 Vasapoli et al.
8,282,388 B2 10/2012 Galati et al.
9,492,959 B2 11/2016 Todesco et al.
2020/0147863 A1 5/2020 Coulter

FOREIGN PATENT DOCUMENTS

JP H1142683 A * 2/1999 ........... B29C 45/281

OTHER PUBLICATIONS

S.C. Tjong and Y.Z Meng., Morphology and Mechanical Characteristics of Compatibilized Polyamide 6-Liquid Crystalline Polymer Composites., Polymer vol. 38 No. 18., pp. 4609-4615., Published by Elsevier Sciences Ltd. (1997). Retrieved Sep. 22, 2021.

(Continued)

*Primary Examiner* — James Sanders
(74) *Attorney, Agent, or Firm* — The Belles Group, P.C.

(57) ABSTRACT

A polymer injection molding system in one embodiment includes a manifold comprising internal flow conduits configured for conveying polymer in a fluidic state. The manifold may be part of a hot or cold runner type molding unit. An injection nozzle fluidly coupled to the flow conduits interfaces with a mold cavity and is configured to inject polymer therein to form a molded article. The nozzle has a tubular valve body defining a central axial passage which receives a movable elongated valve pin. The valve pin is linearly movable to change the nozzle between open and closed positions for discharging or stopping polymer flow therefrom. The valve pin is further rotatable about its axis to induce shear on the polymer. This maintains the polymer in its flowable fluidic state between molding cycles to prevent polymer cold slug formation within the nozzle which can disrupt the flow resulting in incompletely formed articles.

20 Claims, 27 Drawing Sheets

FIG. 13

(56) References Cited

OTHER PUBLICATIONS

Tsung-Tang Hsieh et al., Rheology and Miscibility of Thermotropic Liquid Crystalline Polymer Blends., Journal of Non-Newtonian Fluid Mechanics., Published by Elsevier Sciences Ltd. (1999) pp. 15-35. Retrieved Sep. 22, 2021.

Satoshi Kitayama et al., Multi-Objective Optimization of Injection Molding Process Parameters for Short Cycle Time and Warpage Reduction Using Conformal Cooling Channel., Published online: May 21, 2016., Springer-Verlag London 2016., pp. 1735-1744., Retrieved Sep. 22, 2021.

D. O. Kazmer and P. Barkan., Dynamic Feed Control: A New Method for Injection Molding of High Quality Plastic Parts., PhD Thesis, Citeseer, (1995) pp. 1-190., Retrieved Sep. 22, 2021.

Chandresh Thakur., Development of Advanced Hybrid Polymer Melt Delivery Systems for Efficient High Precision Injection Molding., Journal of Manufacturing Science and Engineering., vol. 142 (Jul. 2020) pp. 071004-1 to 071004-8., Retrieved Sep. 22, 2021.

International Search Report and Written Opinion of PCT/US2021/55819, dated Jan. 25, 2022.

\* cited by examiner

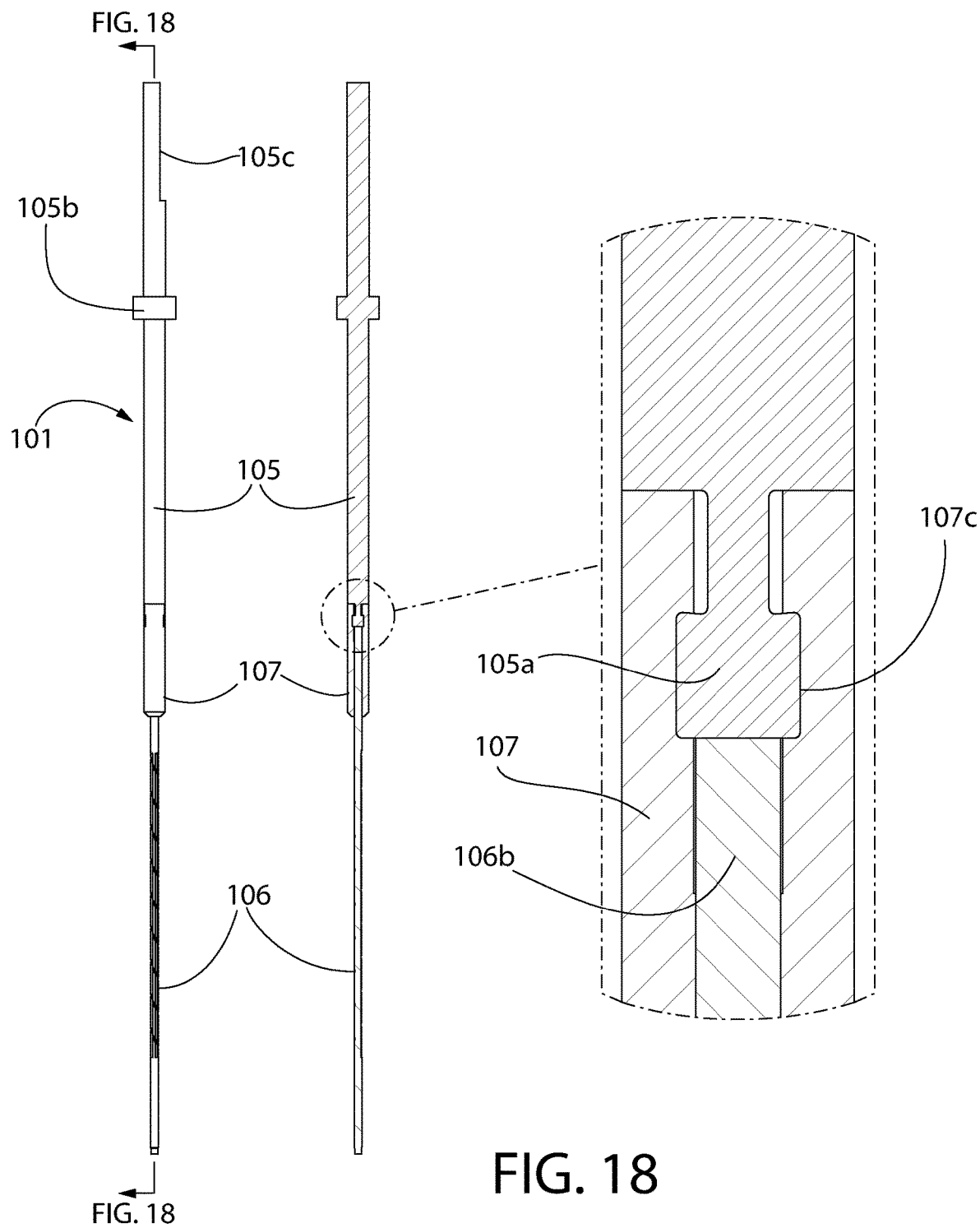

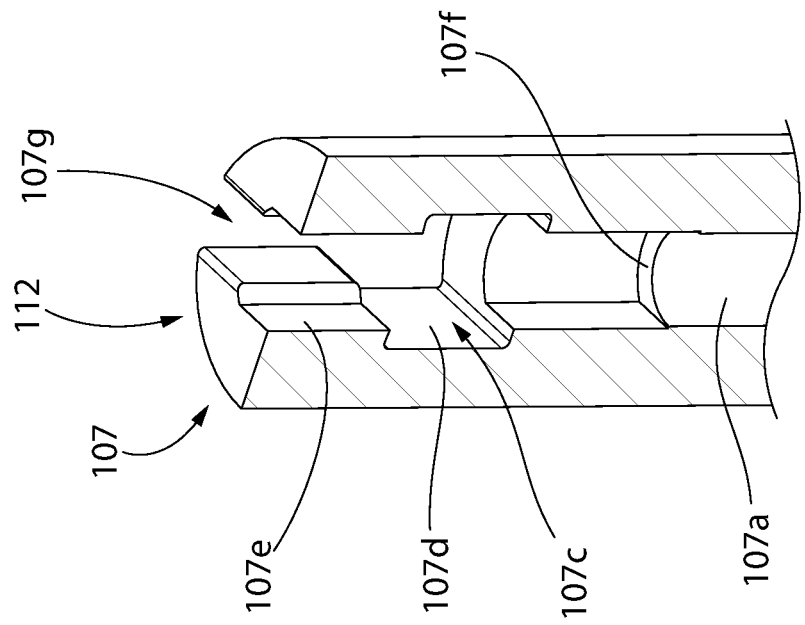
FIG. 24
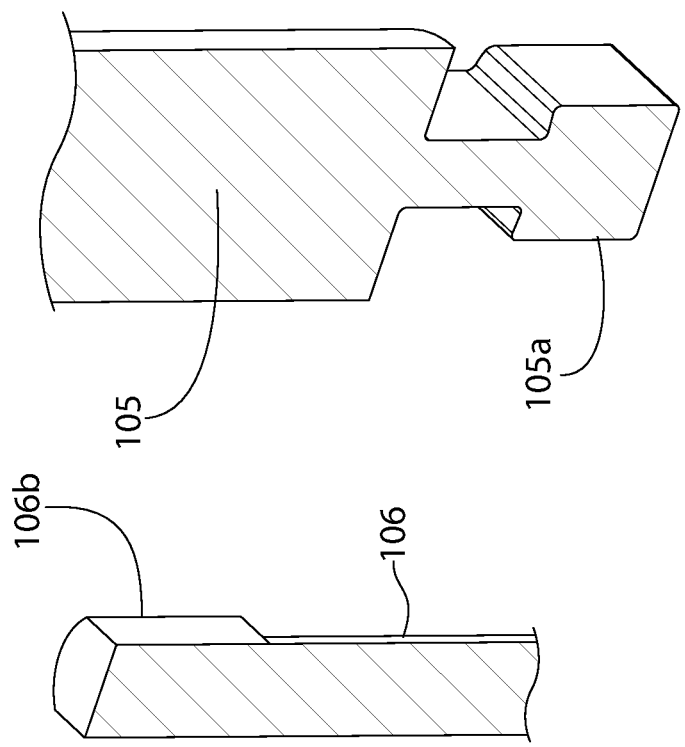
FIG. 23
FIG. 22

Incomplete Filling

Complete Filling

Average shear rate at different RPMs

Average viscosity at different RPMs

SHEAR-INDUCING INJECTION MOLDING SYSTEM

CROSS-REFERENCE TO RELATED APPLICATIONS

This application claims the benefit of U.S. Provisional Application No. 63/036,909 filed Jun. 9, 2020, and further claims the benefit of U.S. Provisional Application No. 63/093,908 filed Oct. 20, 2020; which are incorporated herein by reference in their entireties.

BACKGROUND

The present invention relates generally to polymer injection molding systems, and more particularly to an improved system and apparatuses thereof configured to modify the viscosity of the polymer melt to prevent or minimize cold slug within the molding system.

The polymer product industry worldwide is very large and relies upon efficient and successful conversion of raw polymer base materials (i.e. resins usually in the form of liquid or pellets) into fully formed finished plastic products in order to minimize production costs. In hot runner type injection molding systems, this requires precise control of viscosity throughout the manufacturing process to maintain the polymer melt in a molten and flowable fluidic state. This is most often attempted via temperature control. Hot runner systems generally employ heated manifold plates which contain internal flow conduits ("hot runners") to deliver the hot polymer melt to the mold cavities. But in many cases, polymer temperature cannot be controlled accurately at all locations in the material flow path and also cannot typically be changed rapidly.

In a large majority of cases where products are made via hot runner injection molding, the goal is to produce multiple products of either a single type or multiple types in cavities of a single mold at the same time for efficiency and cost-effectiveness. Examples of products made in this way include electrical connectors, medical syringes, communication device (i.e. cell phone) components, automotive components, and others. In these multi-cavity injection molding processes, precise relative control of the polymer material state is critical to ensure continuous polymer flow progression through all portions of the hot runner manifold and importantly the "hot drop" injection nozzles which form the movable interface with the mold cavities. The need to provide these conditions throughout the entire hot runner molding system is critical to fully fill all of the mold cavities necessary to produce fully formed plastic parts.

In addition, with hot runner based injection molding systems, the processing of some materials such as liquid crystal polymers (LCP) or materials containing colorants can be extremely difficult. LCP materials can change viscosity dramatically in regions such as the tips of hot drop injection nozzles where precise temperature control can be challenging. This can result in "cold slug" polymer formation comprised of partially or fully solidified polymer which can in turn partially or fully occlude the hot runner flow conduits in the manifold, flow channels in the product cavity, and most particularly the small diameter flow passages of the hot drop injection nozzles which are particularly susceptible to this problem. This results in incomplete filling of the mold cavities and wasted defectively molded articles. Moreover, present day colorant additives mixed with the raw polymer can also yield inconsistent product coloration results if the material is kept too hot for too long during the manufacturing process by heating the nozzles and hot runner manifold adding another concern to the problem.

Accordingly, there remains a need for an improved hot runner injection molding systems which minimizes or prevents the foregoing problems.

BRIEF SUMMARY

The present application discloses an injection molding system and related process configured for the imposition of controlled localized shear on the polymer melt inside the injection nozzles which interface with the mold cavities. In one non-limiting embodiments, the molding system may be a hot runner type injection molding system with "hot drop" injection nozzles. The shear rate is selected to maintain the polymer melt in a molten and fluidic state. Inducing shear on the polymer advantageously reduces its viscosity to avoid the foregoing cold slug formation problem (i.e. partially or completely solidified polymer) within the narrow polymer flow passages particularly of the hot drop injection nozzles. This ensures complete filling of the mold cavities with each injection molding cycle thereby producing fully formed end products or articles.

In lieu of past approaches relying upon heating the polymer melt alone to keep the polymer melt in a flowable fluidic state or condition, inducing shear on the polymer melt according to the present disclosure without reliance upon temperature control advantageously avoids cold slug formation while overcoming the foregoing problems associated with solely temperature controlled injection molding systems. However, it bears noting that the present shear-inducing injection molding system is versatile and compatible with temperature control injection molding. Accordingly, shear-inducing components of the present system may be used alone or in conjunction with temperature control in various embodiments.

In one non-limiting implementation, the localized shear strain may be imposed on the polymer melt by a rotatable or otherwise movable shear-inducing element disposed inside the hot drop injection nozzle. The shear-inducing element can be a component that traditionally exists in the hot drop nozzles or a new component that is added to enable the imposition of motion or shear on the polymer melt. In one embodiment, such a shear-inducing element may be the axially movable valve pin that resides inside hot drop nozzle which shuts off polymer flow through the nozzle to the mold cavities between molding cycles. In addition to linearly translating between open and closed positions of the nozzle, the valve pin can additionally be rotated at a desired rotational speed (RPM/revolutions per minute) about its centerline axis in a controlled fashion to induce shear on the polymer melt and maintain a minimum viscosity value selected to prevent polymer solidification and cold slug formation. In one embodiment, a mechanical drive mechanism may be provided to rotate the valve pin, as further described herein. Other methods however are possible to rotate the valve pin shear-inducing element.

In one aspect, a polymer injection molding system comprises: a manifold comprising a plurality of internal flow conduits configured for conveying polymer in a fluidic state; an injection nozzle fluidly coupled to the flow conduits, the injection nozzle configured to interface with a mold cavity and changeable between open and closed positions; the injection nozzle comprising a tubular valve body defining a pin axis, a central axial passage extending along the pin axis and configured to dispense polymer into the mold cavity, and an elongated valve pin movably disposed in the central axial passage; wherein the valve pin is rotatably movable and configured to induce shear on the polymer. A rotary drive mechanism coupled to the valve pin is operable to rotate the valve pin. The valve pin may be rotated when the injection nozzle is in the closed and/or open positions.

In another aspect, an injection nozzle assembly for a polymer molding system comprises: an injection nozzle configured to receive polymer in a fluidic state, the injection nozzle configured to interface with a mold cavity and changeable between open and closed positions; the injection nozzle comprising a tubular valve body defining a pin axis, a central axial passage extending along the pin axis and configured to dispense polymer into the mold cavity, and an elongated valve pin movably disposed in the central axial passage; the valve pin being axially translatable between a projected position when the injection nozzle is in the closed position, and a retracted position when the injection nozzle is in the open position; and the valve pin further being rotatably movable and operable to induce shear on the polymer.

In yet another aspect, a method for operating a polymer injection molding system comprises: providing an injection nozzle fluidly coupled to a source of fluidic polymer, the injection nozzle being in a closed position; coupling the injection nozzle to a mold cavity; changing the injection nozzle to an open position by moving a valve pin inside the injection nozzle to a retracted position; injecting the fluidic polymer into the mold cavity; changing the injection nozzle to the closed position by moving the valve pin to a projected position; and rotating the valve pin about its axis to impart a shear force on the fluidic polymer.

BRIEF DESCRIPTION OF THE DRAWINGS

The present invention will become more fully understood from the detailed description and the accompanying drawings, wherein like elements are labeled similarly and in which:

FIG. 17 is a first side view of the valve pin;

FIG. 18 is a side cross-sectional view therefrom;

FIG. 22 is a partial cross-sectional perspective view of the proximal end of the distal working pin member showing a coupling feature thereof;

FIG. 23 is a partial cross-sectional perspective view of the distal end of the proximal operating pin member showing a coupling feature thereof;

FIG. 24 is partial cross-sectional perspective view of a coupler which receives the coupling features of the proximal operating and distal working pin members;

Figure 1:
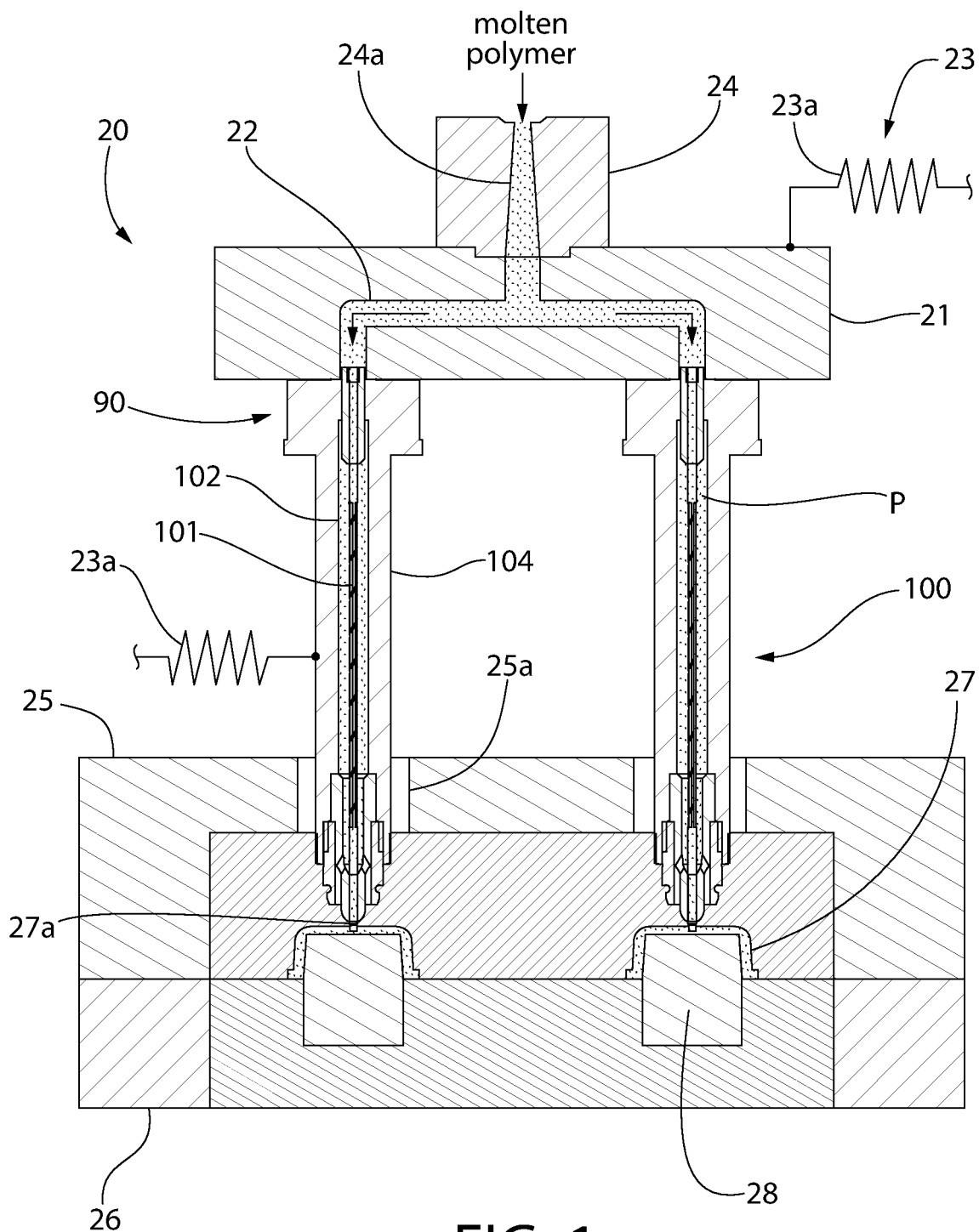
FIG. 1 is a cross-sectional schematic diagram of one embodiment of an injection molding unit according to the present disclosure.

All drawings are schematic and not necessarily to scale. Features shown numbered in certain figures which may appear un-numbered in other figures are the same features unless noted otherwise herein. A general reference herein to a figure by a whole number which includes related figures sharing the same whole number but with different alphabetical suffixes shall be construed as a reference to all of those figures unless expressly noted otherwise.

DETAILED DESCRIPTION

The features and benefits of the invention are illustrated and described herein by reference to non-limiting exemplary ("example") embodiments. This description of exemplary embodiments is intended to be read in connection with the accompanying drawings, which are to be considered part of the entire written description. Accordingly, the disclosure expressly should not be limited to such exemplary embodiments illustrating some possible non-limiting combination of features that may exist alone or in other combinations of features.

In the description of embodiments disclosed herein, any reference to direction or orientation is merely intended for convenience of description and is not intended in any way to limit the scope of the present invention. Relative terms such as "lower," "upper," "horizontal," "vertical,", "above," "below," "up," "down," "top" and "bottom" as well as derivatives thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise.

As used throughout, any ranges disclosed herein are used as shorthand for describing each and every value that is within the range. Any value within the range can be selected as the terminus of the range. In addition, any references cited herein are hereby incorporated by reference in their entireties. In the event of a conflict in a definition in the present disclosure and that of a cited reference, the present disclosure controls.

FIG. 1 is a schematic diagram showing one non-limiting example of an injection molding unit 20 configured to form a hot runner type injection molding system 90 with shear-inducing elements for polymer viscosity control according to the present disclosure. Unit 20 generally includes a hot runner block or plate 21, a fixed/stationary mold cavity block or plate 25, and movable mold core block or plate 26. Cavity plate 25 defines a plurality of mold cavities 27 configured for producing the particular molded polymer part or article intended. Each cavity has an entrance or opening such as gate 27a for initially receiving polymer melt from the injection nozzles before distribution throughout the voids of the cavity. Nozzle receptacles 25a formed in cavity plate 25 receive and allow the injection nozzles 100 to be detachably and fluidly coupled to the cavity plate and mold cavities. Core plate 26 is removably engageable with fixed cavity plate 25 for molding the components, and separable therefrom to eject the molded components thereafter in the usual known manner after each molding cycle. Depending on the shape and type of components to be molded, the core plate is configured to support one or more core pins or inserts 28 used to form variously sized and shaped recesses or openings in the molded component. The illustrated non-limiting example shows a setup for molding plastic caps.

Hot runner manifold plate 21 comprises a plurality of flow conduits 23 (e.g., "runners") configured to convey polymer P from polymer inlet coupling 24 to eventually the mold cavities 27 via the runner system components. Inlet coupling 24 defines the sprue 24a which is fluidly coupled to the branched runner system. Flow conduits 23 form a multi-branched flow network to distribute and supply molten polymer ("polymer melt") from a single source via the inlet coupling to each of the flow cavities. In the present hot runner system, manifold plate 21 is coupled to a heat source 23 configured and operable to heat the manifold and maintain the polymer in a flowable fluidic state or condition. Manifold plate 21 may be heated electrically via one or more electric resistance heating elements 23a in one non-limiting embodiment (represented schematically in FIG. 1). Heating elements 23a may be located externally, internally, or a combination thereof with respect to the manifold plate. Other sources of heat however may be used including heated fluids (e.g. water, glycol, etc.) which flows through passages formed throughout the manifold plate.

Figure 2:
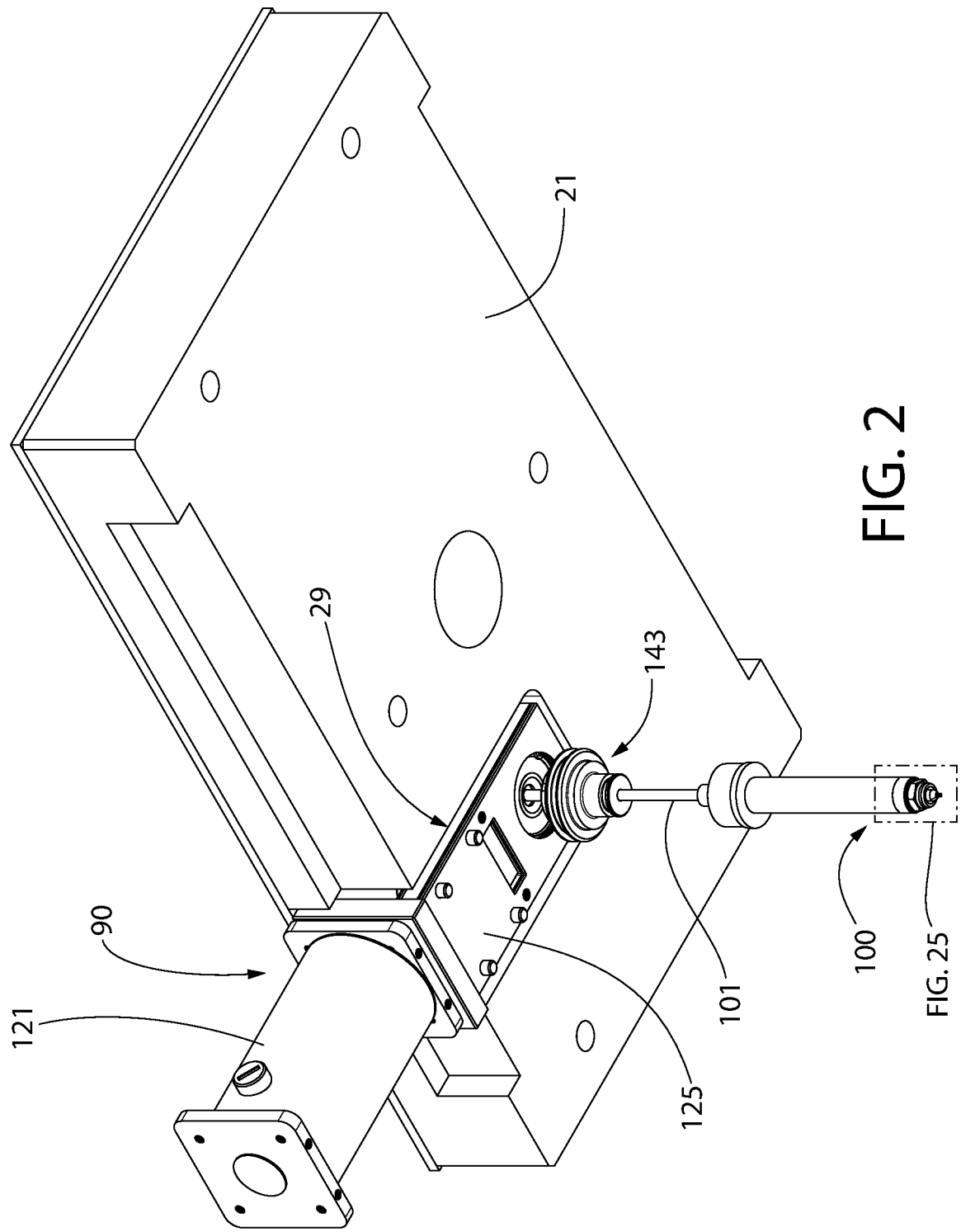
FIG. 2 is a bottom perspective view of the manifold, injection nozzle assembly, and rotary drive mechanism thereof.
Figure 3:
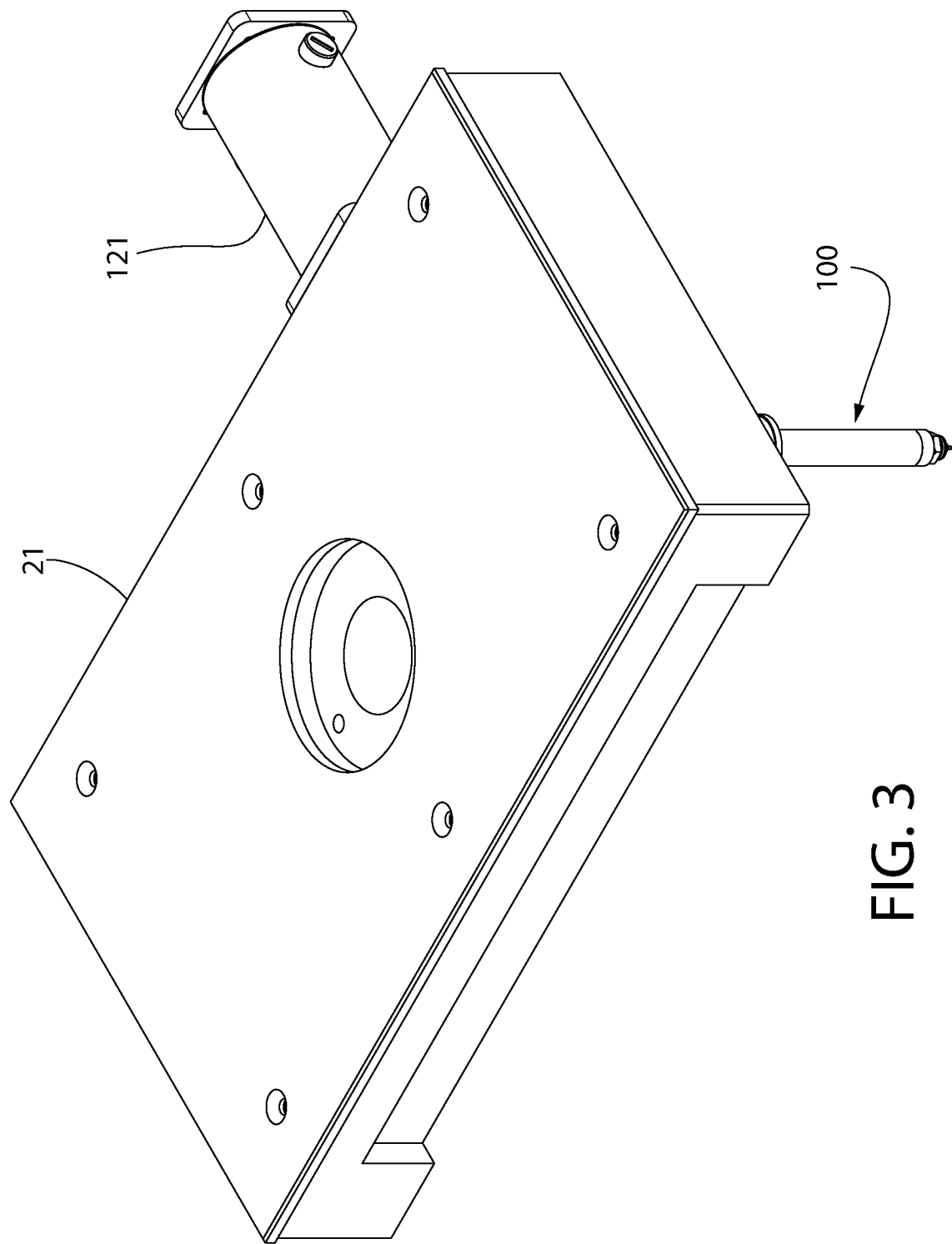
FIG. 3 is a top perspective view thereof.
Figure 4:
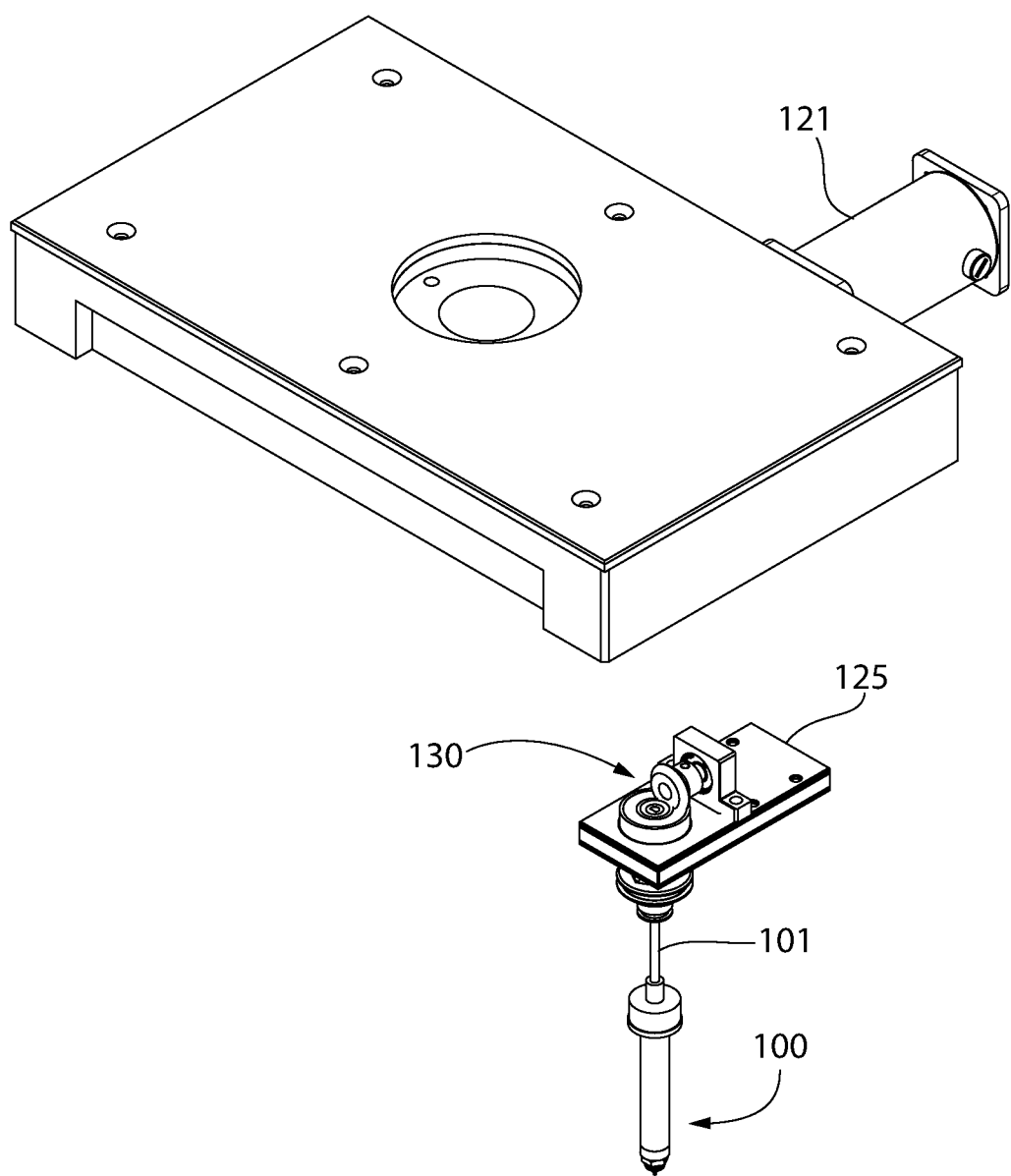
FIG. 4 is a partial exploded perspective view thereof.
Figure 5A:
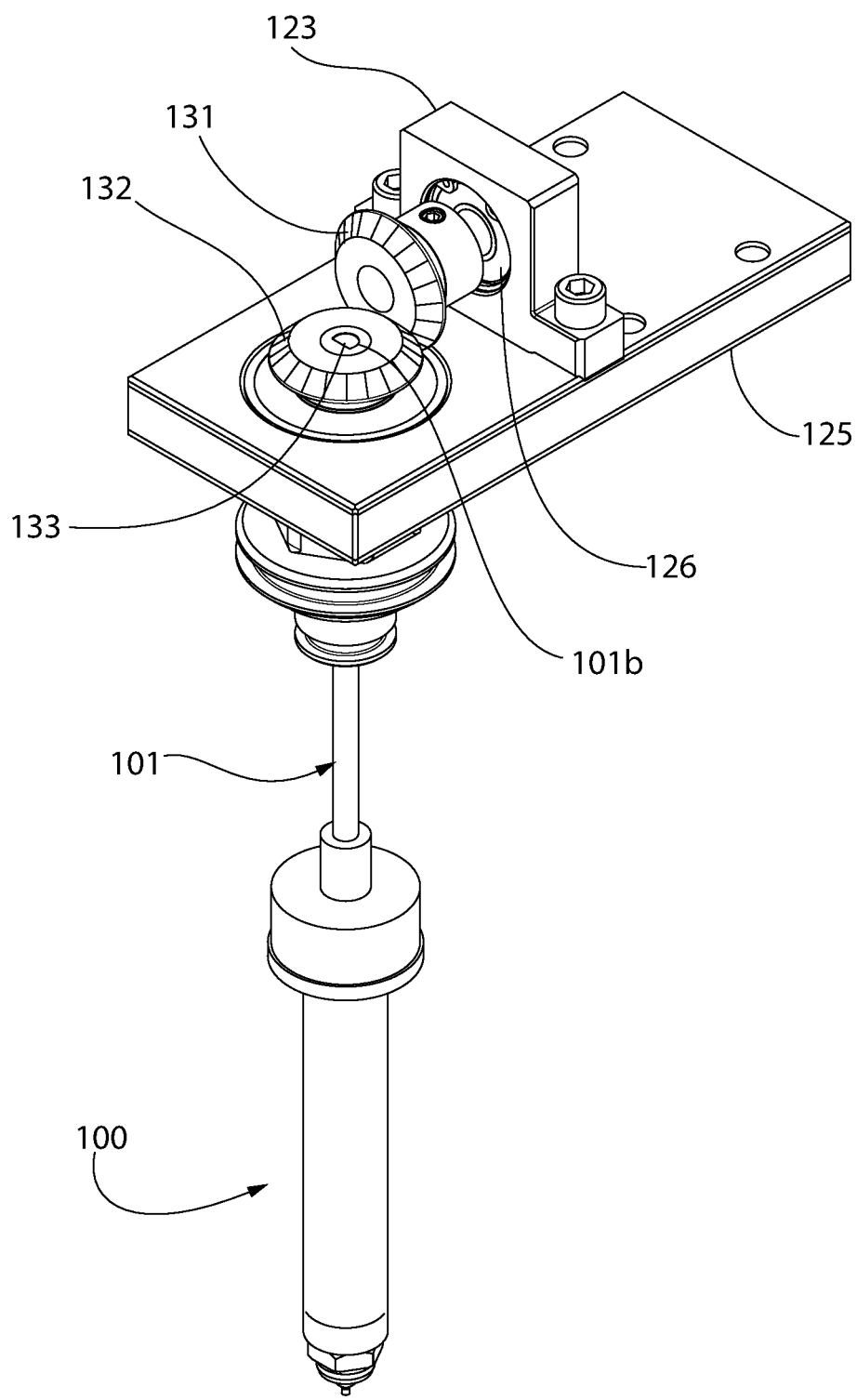
FIG. 5A is a perspective view of injection nozzle and portion of the rotary drive mechanism showing the gear drive assembly and the nozzle in a closed position.
Figure 5B:
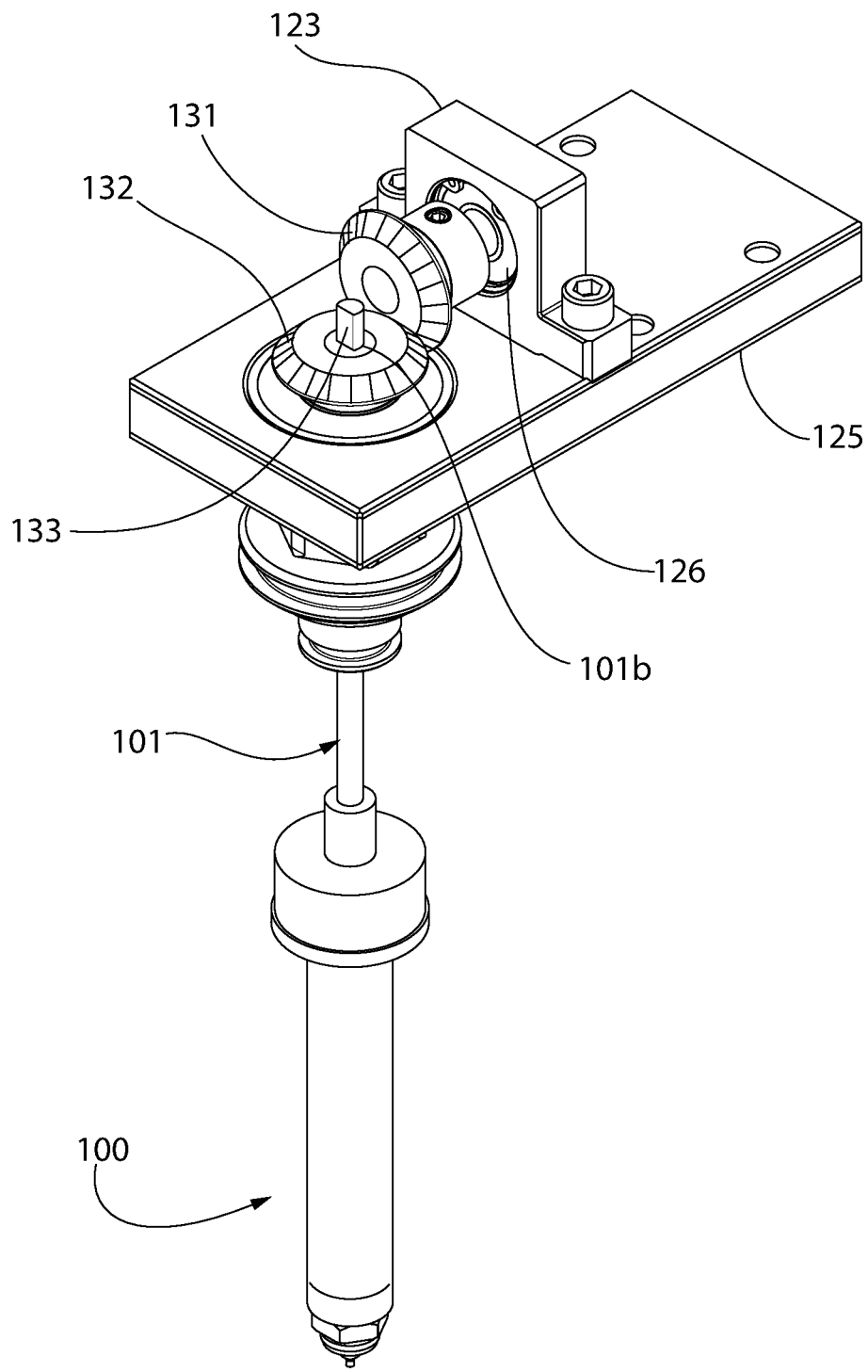
FIG. 5B is a perspective view thereof showing the injection nozzle in an open position for dispensing fluidic polymer.
Figure 6:
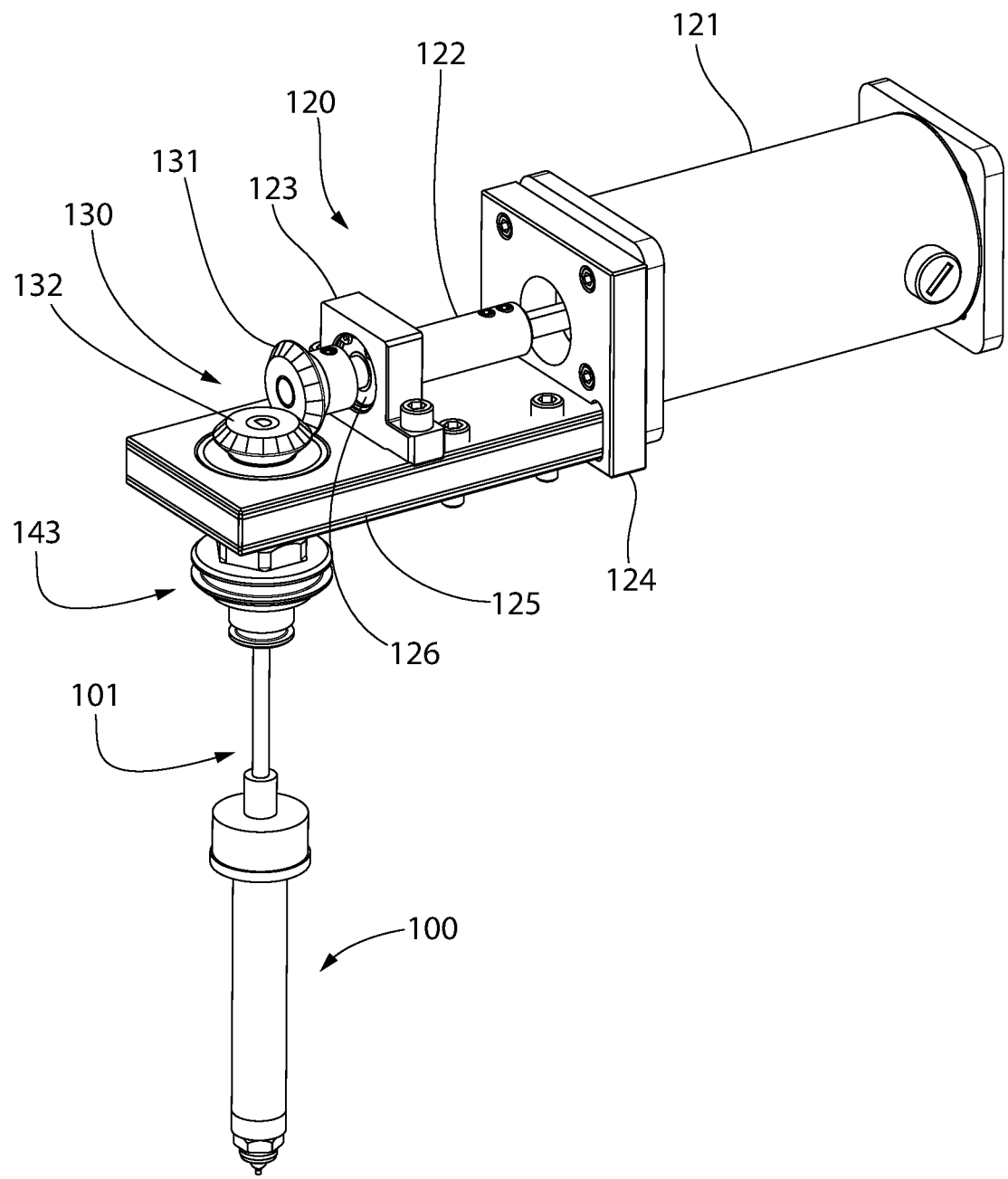
FIG. 6 is a perspective view of injection nozzle and the rotary drive mechanism showing the gear drive assembly and motor coupled thereto.
Figure 7:
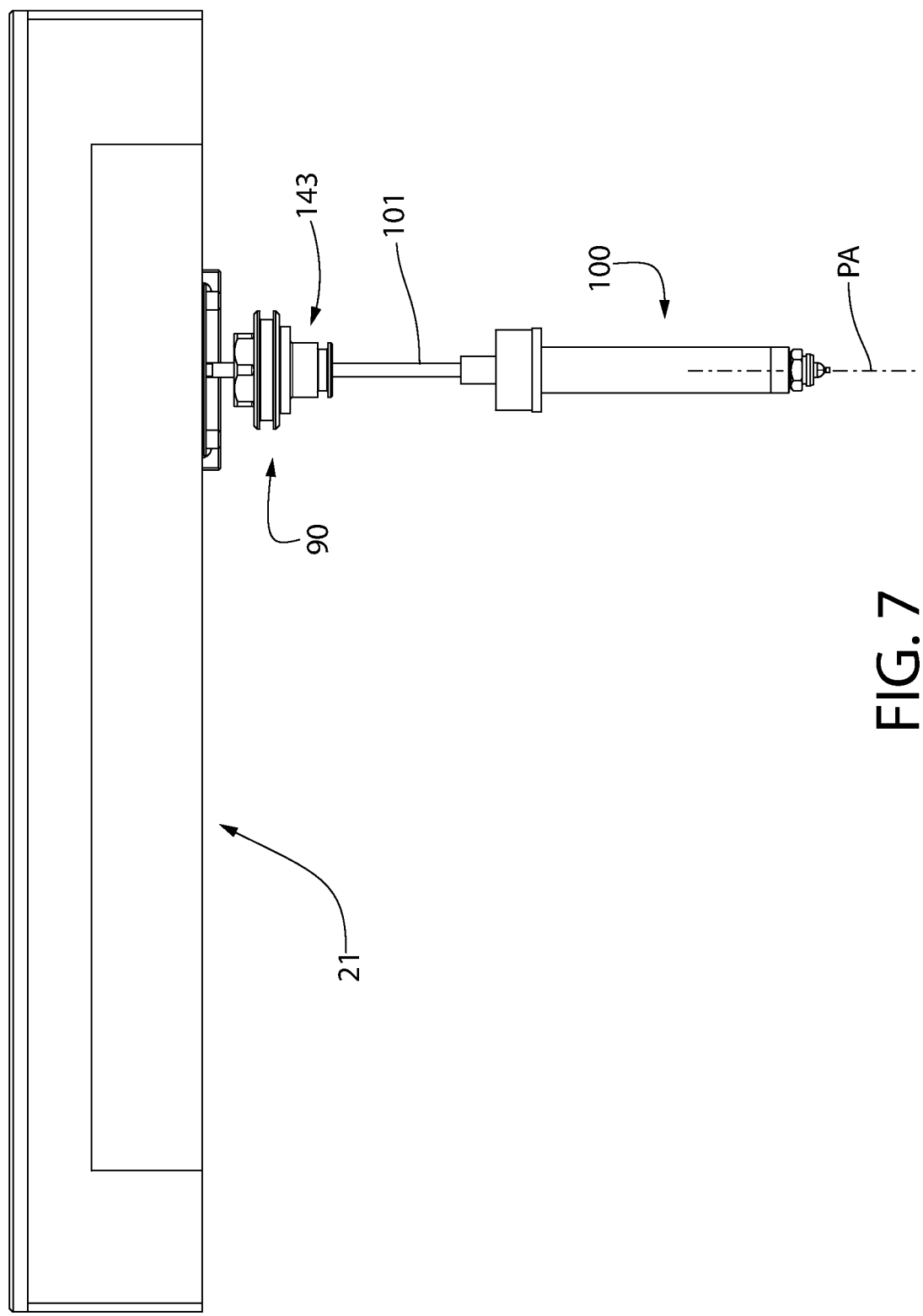
FIG. 7 is a first side view of the manifold and injection nozzle assembly.
Figure 8:
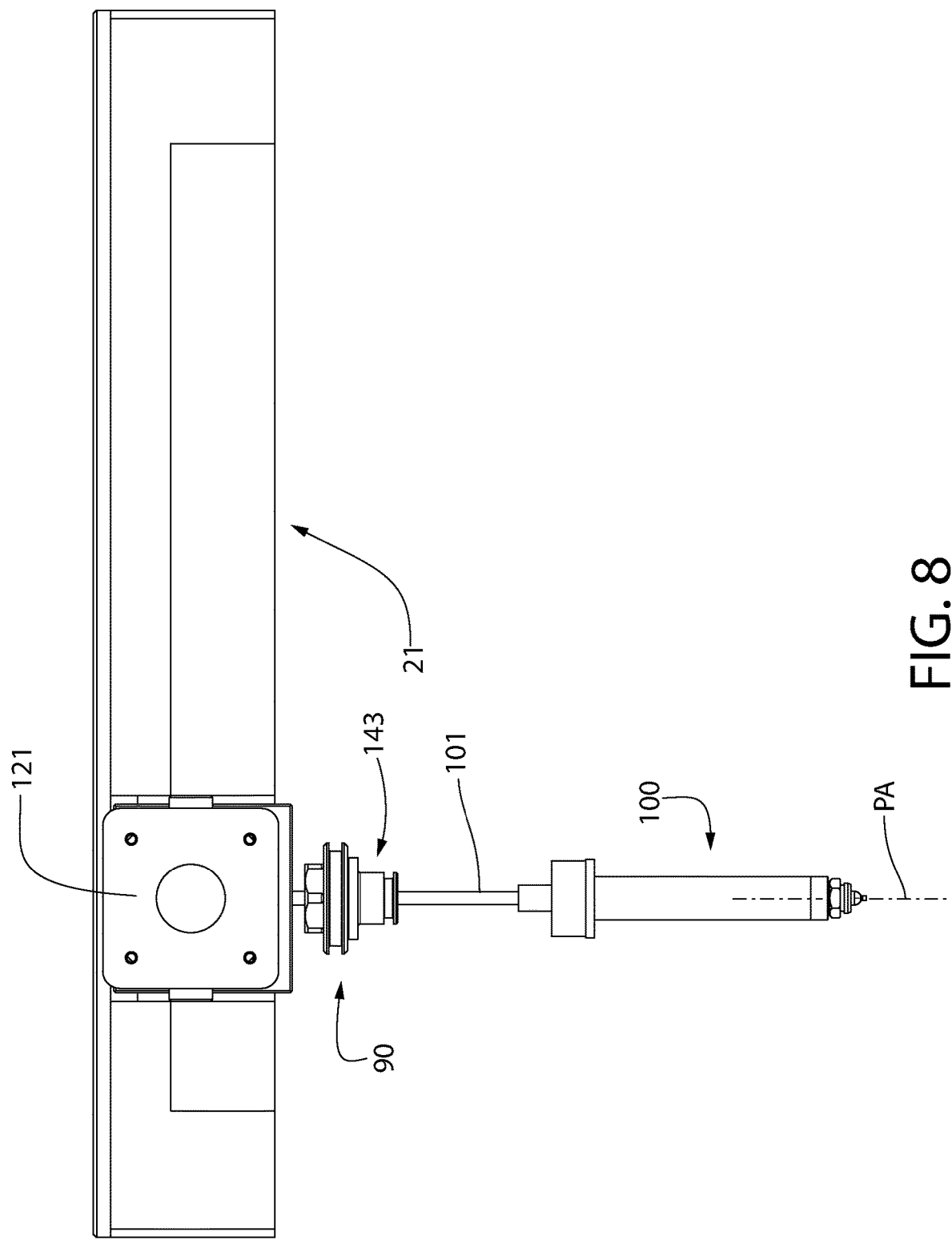
FIG. 8 is a second side view of the manifold and injection nozzle assembly.
Figure 9:
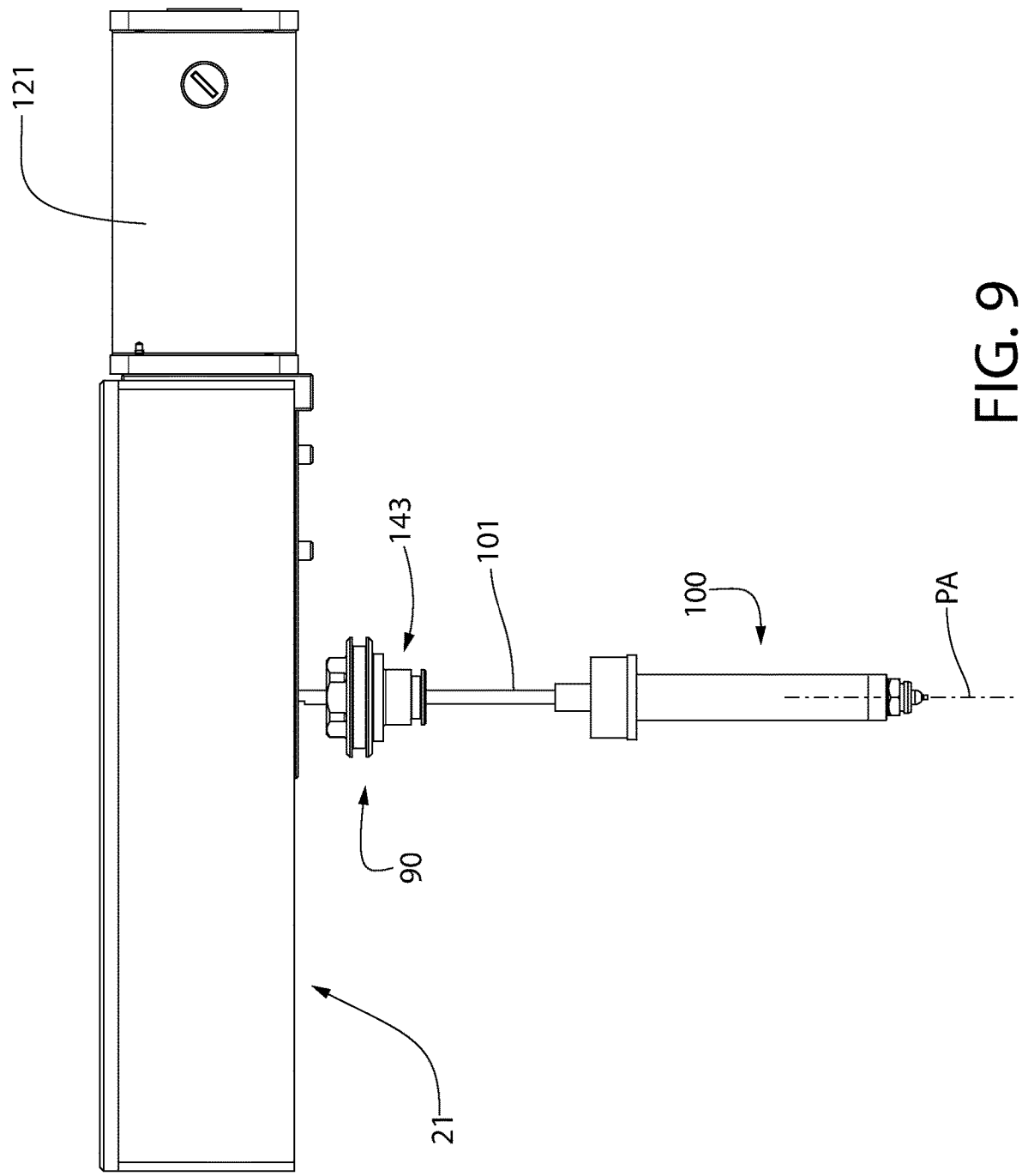
FIG. 9 is a third side view of the manifold and injection nozzle assembly.
Figure 10:
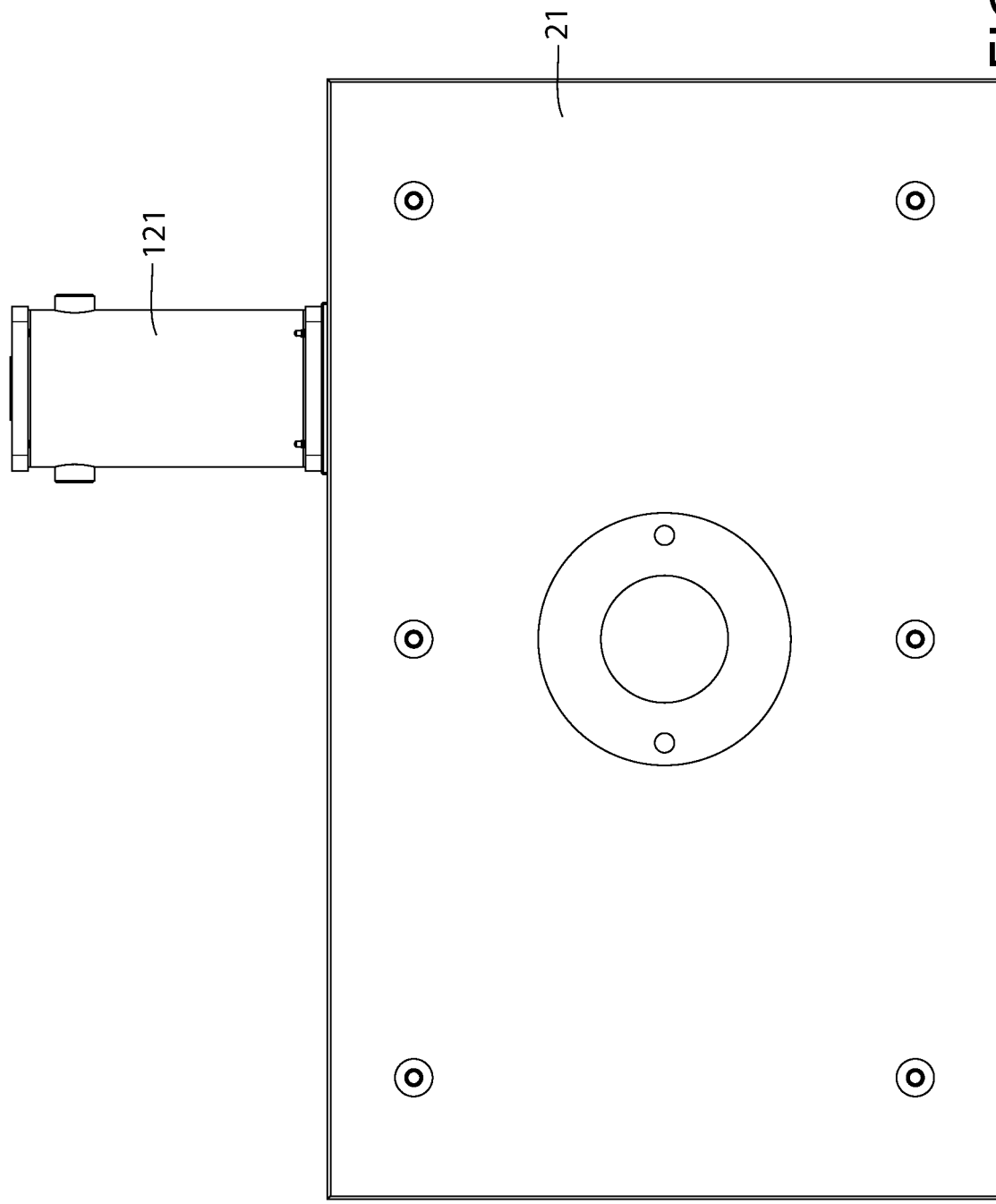
FIG. 10 is a top view thereof.
Figure 11:
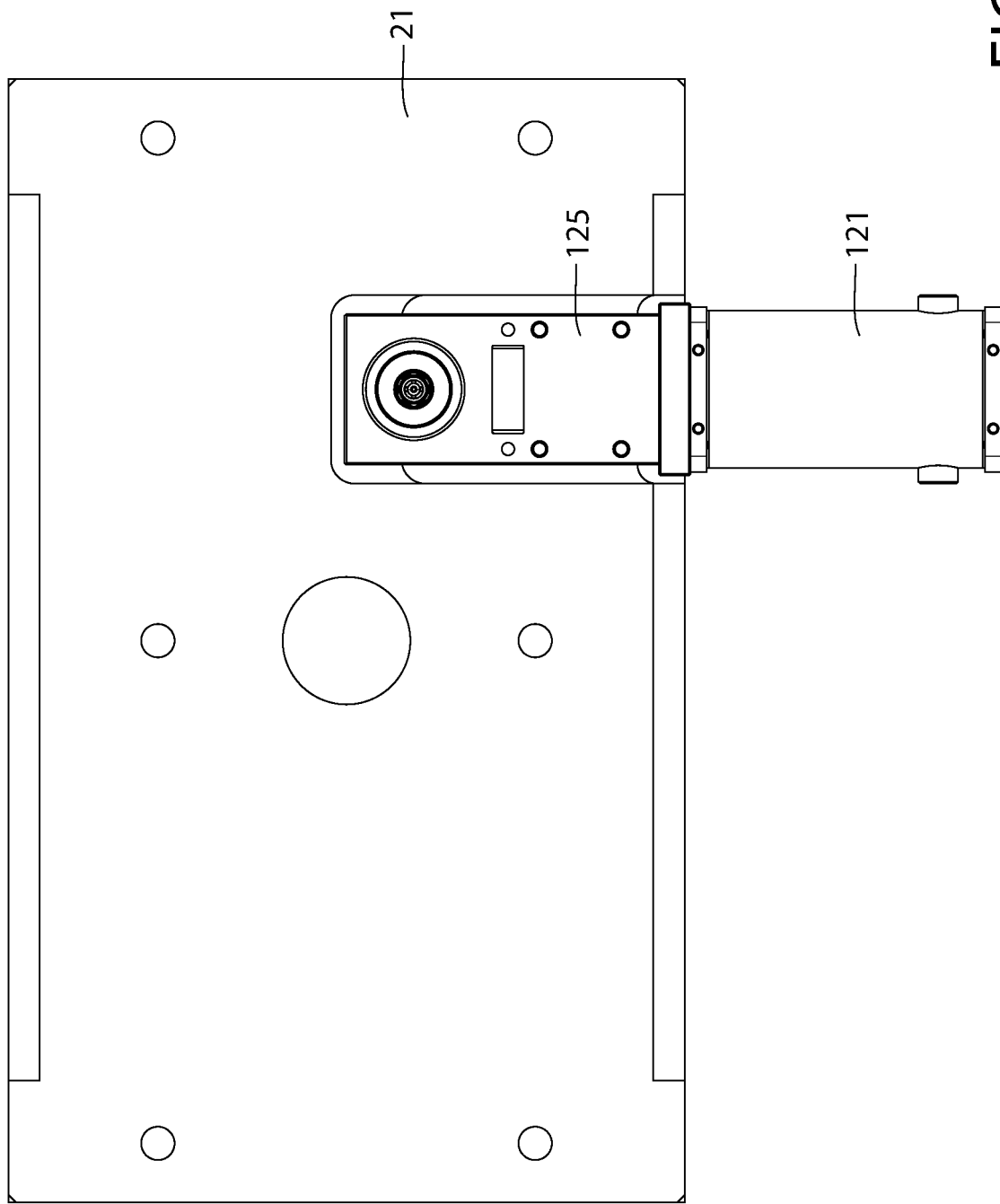
FIG. 11 is bottom view thereof.

Referring now generally to FIGS. 1-25, the present hot runner type injection molding system 90 further includes a plurality of "hot drop" injection nozzles 100, mechanical rotary drive mechanism 120, and actuating mechanism 140. Each nozzle 100 is supported by and movably mounted to a respective baseplate 125. The baseplates may be detachably mounted in a respective mounting recess or receptacle 29 formed in manifold plate 21 (best seen in FIGS. 2 and 12). Receptacles 29 may be downwardly open in one embodiment as shown. Threaded fasteners or another mechanical means may be used to detachably mount and retain the nozzle assembly to the manifold plate.

Each injection nozzle 100 is fluidly coupled to the polymer flow conduits 22 in the hot runner manifold plate 21. The injection nozzle is configured to interface with one of the mold cavities 27 of mold cavity plate 25 for injecting the flowable fluidic polymer into its respective cavity. Injection nozzles 100 are configured to acts as valves to regulate the flow of fluidic polymer (i.e. polymer melt) to the mold cavities and are changeable between open and closed positions for that purpose.

Each injection nozzle 100 comprises an elongated tubular nozzle body 104 defining a pin axis PA, a central axial passage 102 extending along the pin axis, and an elongated valve pin 101 movably disposed in the central axial passage. Passage 102 is configured to convey and dispense polymer through the nozzle in the annulus 103 formed between the pin and inner walls of the nozzle axial passage and into the mold cavity. The axial passage 102 has a cylindrical shape with circular cross section in one embodiment. The nozzle body 104 includes an open proximal end 104a and open distal end 104b each of which communicate with the axial passage 102. In one embodiment, the proximal end portion of the nozzle body 104 may be diametrically enlarged in comparison to the adjoining middle and lower distal end portions of the body.

FIGS. 12-25 show one hot drop injection nozzle 100 and features thereof in greater detail. Valve pin 101 in one non-limiting embodiment may be comprised of a two-piece assemblage including a proximal operating pin member 105 and distal working pin member 106. Both members 105, 106 are generally cylindrical and axially elongated having a substantially greater length than their respective diameters (e.g., greater than five diameters). Working pin member 106 is configured to impart a shear force on the polymer melt to maintain the melt in a molten flowable state. Operating pin member 105 is configured to mechanically interface with the rotary drive mechanism 120 and actuating mechanism 140 which impart motion to the valve pin 100, as further described herein.

Working pin member 106 includes a diametrically enlarged proximal end 106b and terminal distal end 106a. Operating pin member 105 includes a distal end 105a and proximal end 105d defined by an extension key 105c engageable with the rotary drive mechanism. An annular retention flange 105b extends radially outwards between the proximal and distal ends as shown. The key and retention flange are described later herein with respect to the rotary drive mechanism and actuating mechanism for the valve pin 100 which collectively provide two degrees of motion of the valve pin.

The operating and working pin members 105, 106 may be coupled or joined together into a single unit by coupler 107. Coupler 107 has a tubular sleeve-like body comprising distal end 111, proximal end 112, and an axial through passage 107a extending between and through these opposite ends of the body. The proximal end 112 of coupler body is bifurcated defining laterally open transverse key slot 107c which also axially penetrates the proximal end forming top opening 107g (best shown in FIG. 24). Key slot 107c communicates with through passage 107 of coupler 107 and is both upwardly open at top and laterally open. Operating pin member 105 may be detachably keyed to coupler in one embodiment. Key slot 107c therefore may be complementary configured to T-shaped distal end 105a of operating pin member 105 of the valve pin 100 and correspondingly has an inverse T-shape to retain the operating pin member (see also FIGS. 17-18, 21, and 23). Key slot 107c therefore includes a distal opening 107d which is larger than contiguously formed proximal opening 107e. Operating pin member 105 is detachably mounted to coupler 107 by laterally inserting the T-shaped distal end into key slot 107c. Once seated in the key slot, the operating pin member cannot be axially withdrawn from the coupler in the direction of the pin axis PA.

Figure 21:
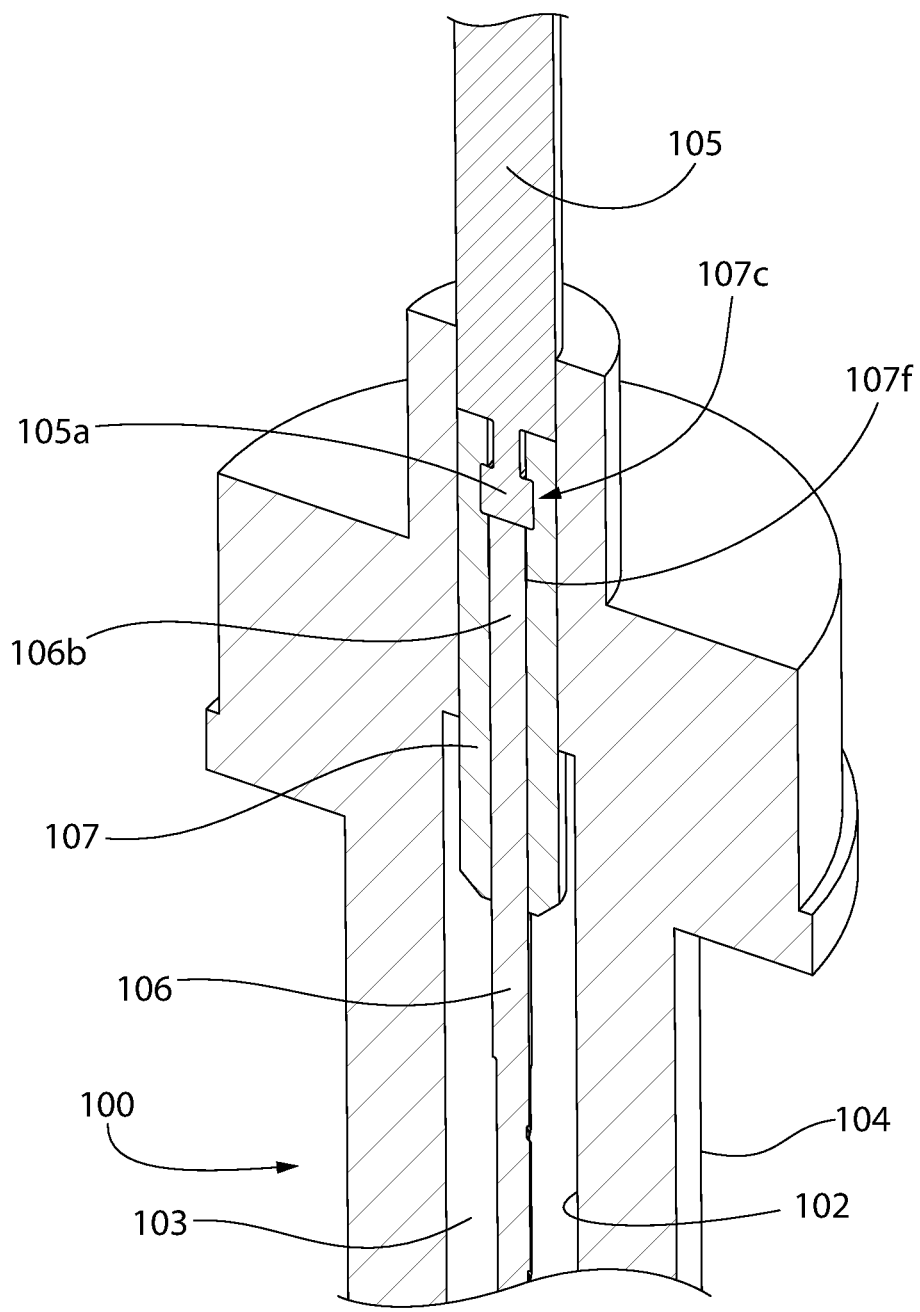
FIG. 21 is a cross-sectional perspective view of the proximal portion of the injection nozzle showing the coupling arrangement between a proximal operating pin member to a distal working pin member.

Coupler 107 further defines an internal annular ledge or lip 107f located within through passage 107a in a diametrically enlarged recess 107h to retain valve pin working pin member 106 (see, e.g. FIGS. 19-22 and 24). Annular lip 107f abuttingly receives and engages diametrically enlarged proximal end 106b of the distal working pin member 106 of valve pin 100. To mount working pin member 106 to coupler 107, the entire working pin member (including proximal end 106b) may be axially insertable and slideable through top opening 107g of coupler 107 along the direction of the pin axis PA. The enlarged proximal end 106b engages the annular lip 107f which also acts as a travel stop. Once the working pin member 106 is installed in the coupler 107, the operating pin member 105 may then be mounted as previously described above. The operator member 105 traps the working pin member 106 in the coupler 107. Furthermore, after the two-piece valve pin 100 is inserted axially into the central axial passage 102 of the nozzle body 104, the proximal operating pin member 105 cannot be laterally withdrawn from transverse key slot 107c due to interference by the body sidewalls. FIG. 21 shows the complete coupling of the operating pin member 105 and working pin member 106.

Advantageously, the foregoing two-piece valve assembly allows either the operating and/or working pin members 105, 106 to be readily replaced as needed or formed of different materials. The working pin member 106 which is projected through and retracted from the discharge orifice or opening 110 of the injection nozzle 100 with each molding cycle is particularly prone to frictional wear which can lead to nozzle polymer melt leakage between cycles. The two-piece construction allows the operating pin member 105 which mechanically interfaces with the rotary drive mechanism and actuating mechanism for the valve pin 100 to have a more robust construction (e.g., larger diameter, etc.) since these mechanisms impart great degree of mechanical tensile and shear stress on this component than the working pin member. In addition, the two-piece valve pin is also more cost-effective and easier to fabricate; particularly the very thin and small diameter working pin member 106. In other possible embodiments, however, valve pin 100 may be one piece having a monolithic unitary structure without need for coupler 107.

Other types of coupling mechanisms and devices may be used to couple the operating and working pin members 105, 106 together. One example includes threadably coupling the pin members together either directly or through an intermediate threaded coupler. Brazing or welding may be used in other examples depending on the type of pin materials used. Other possible methods include interference/frictional fitting or shrink fitting to join the pin members. Accordingly, the invention is not limited by the type of mechanical method used to coupled the pin members together.

Returning now to injection nozzles 100 with continuing general reference to FIGS. 12-25, each injection nozzle may further include a nozzle tip member 108 and retention bushing 109 coupled to distal end 104b of nozzle body 104. Nozzle tip member 108 has a tubular structure and defines axial through passage 108a which communicates with central axial passage 102 of the valve body 104 and slideably receives valve pin 101 therethrough. Nozzle tip member 108 defines discharge opening 110. Retention bushing 109 traps and secures the nozzle tip member 108 to the valve body 104. The bushing includes axial through passage 109a which receives tip member 108 partially therethrough (best shown in FIG. 14). The distal end of tip member 108 may protrude beyond the end of the bushing as shown. Bushing 109 may be removably coupled to distal end 104b of valve body 104 by any suitable means, such as a threaded coupling. This allows nozzle tip member 108 to be easily replaced when worn out.

Figure 25:
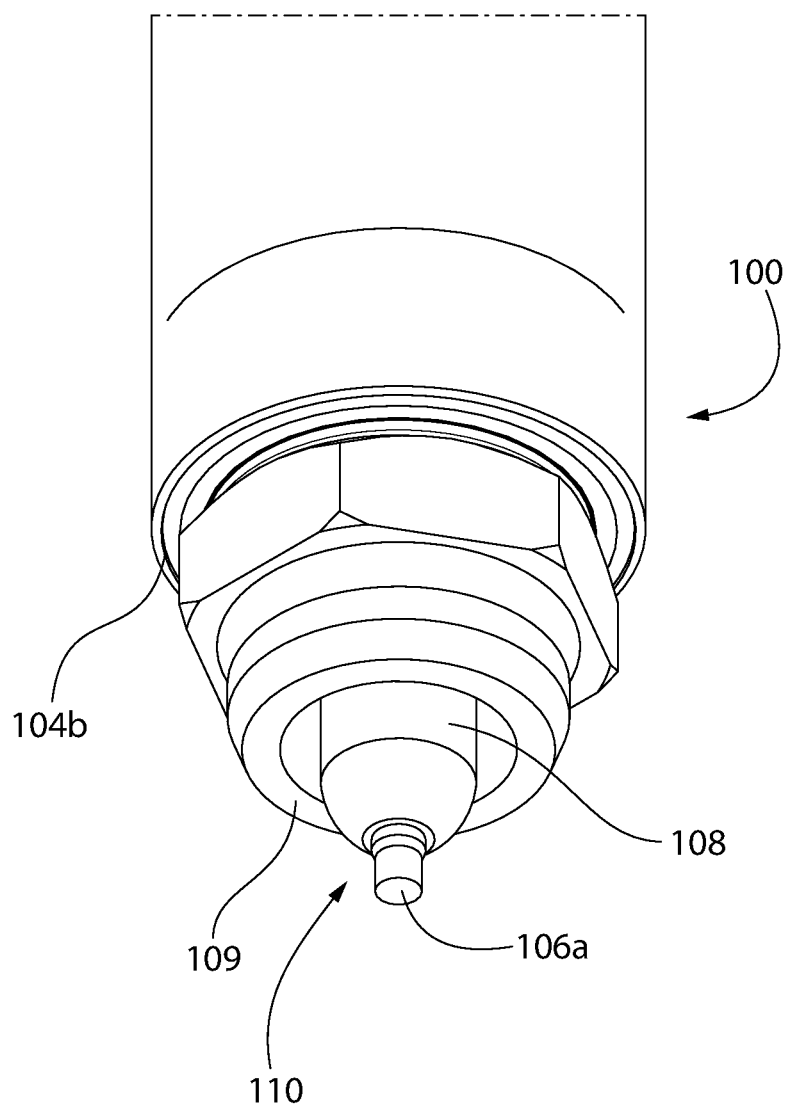
FIG. 25 is an enlarged view of the distal discharge end of the injection nozzle showing the valve pin in a projected position which seals the discharge opening of the nozzle.

Valve pin 101 is axially movable between a retracted position in which the distal end of the pin (e.g., end 106a of the distal working pin member 106) is withdrawn into the nozzle tip member 108 and through passage 108a thereof, and a projected position in which the distal end projects and extends outwards beyond the discharge opening 110 of the injection nozzle 100 (see, e.g. FIG. 25). The projected position is associated with the closed position of nozzle 100 in which the polymer melt cannot leave the nozzle. The retracted position is associated with the open position of the nozzle for injecting polymer into the mold cavity.

Although injection nozzles 100 may use shear imposed on the polymer melt alone according to the present disclosure to lower viscosity and maintain the melt in a flowable molten or fluidic condition, certain embodiments may further incorporate and add heating elements 23a to the nozzles for additional viscosity control via elevated polymer temperatures (see, e.g. FIG. 1).

The rotary drive mechanism 120 and actuating mechanism 140 for operation of the valve pins 100 of injection nozzles 100 will now be further described. These mechanisms collectively operate to provide two degrees of motion to the valve pin. The rotary mechanism is configured to impart rotational motion to the valve pin 100 in which the pin rotates about its pin axis PA. The actuating mechanism is configured to impart linear motion or translation of the pin 100 relative to the nozzle body 104 for opening and closing the nozzles. The rotary and actuating mechanisms may be configured and operated to impart the foregoing motions to the valve pin 100 either sequentially in series, or concurrently.

Referring initially in general to FIGS. 1-12, rotary drive mechanism comprises an elongated baseplate 125, electric motor 121 with rotatable motor drive shaft 122, motor mounting bracket 124, bearing block 123, and gear train or assembly 130. Baseplate 125 may have any suitable configuration. In one embodiment, the baseplate may be rectangular in shape with planar opposing upper and lower major sides. Motor 121 may be mounted adjacent to one end of the baseplate, and gear assembly 130 may be mounted adjacent to the opposite end. Bearing block houses shaft bearing 126, which may be any suitable commercially-available type bearing designed to support a rotating drive shaft 122. Bearing 126 supports the free distal end of the motor drive shaft as shown. Both the bearing block 123 and motor mounting bracket 124 may be attached to the baseplate 125 for support. Baseplate 125 in turn is supported by hot runner manifold plate 21 to which the baseplate is mounted.

Gear assembly 130 in one non-limiting embodiment includes drive gear 131 and driven gear 132. Drive gear is coupled to motor drive shaft 122 and rotates with the shaft to impart rotation to driven gear 132. The drive and driven gears may be angled bevel gears oriented 90 degrees (perpendicularly) to each other as shown.

Accordingly, in one preferred embodiment, an angled rotary drive mechanism is provided as shown. Motor 121 and its drive shaft 122 defining shaft axis PM are oriented perpendicularly (90 degrees) to the valve pin 101 of injection nozzle 100 and the pin axis PA (best shown in FIG. 12). Advantageously, the provides clearance above driven gear 132 so that the extension key 101b at the top end of valve pin 101 may be freely projected outwards from the gear without inference from the drive mechanism when the pin is in the retracted position associated with an open nozzle position. The pin extension key 101b is slideably movably outwards from and back into keyhole 133 in the hub of driven gear 132 as the valve pin 101 is raised or lowered (see, e.g. FIGS. 5A and 5B).

Valve pin 101 is slideably coupled to driven gear 132 for linear motion along pin axis PA, but rotationally locked to the driven gear for rotating the pin to induce a shear force on the polymer melt to maintain its molten fluidic state. To achieve this dual functionality, extension key 101b of valve pin 101 and keyhole 133 of driven gear 132 may have complementary configured non-circular cross-sectional shapes (see, e.g. FIGS. 5A-B, 15-17, and 19-20). Accordingly, the extension key and its corresponding keyhole may include at least one flat surface to rotationally lock the valve pin to the driven gear 132. A half/semi-circular cross-sectional shape is illustrated as one non-limiting example recognizing that other non-circular shapes including numerous polygonal shapes (e.g. hexagonal, octagonal, triangular, square, etc.) may be used.

Figure 12A:
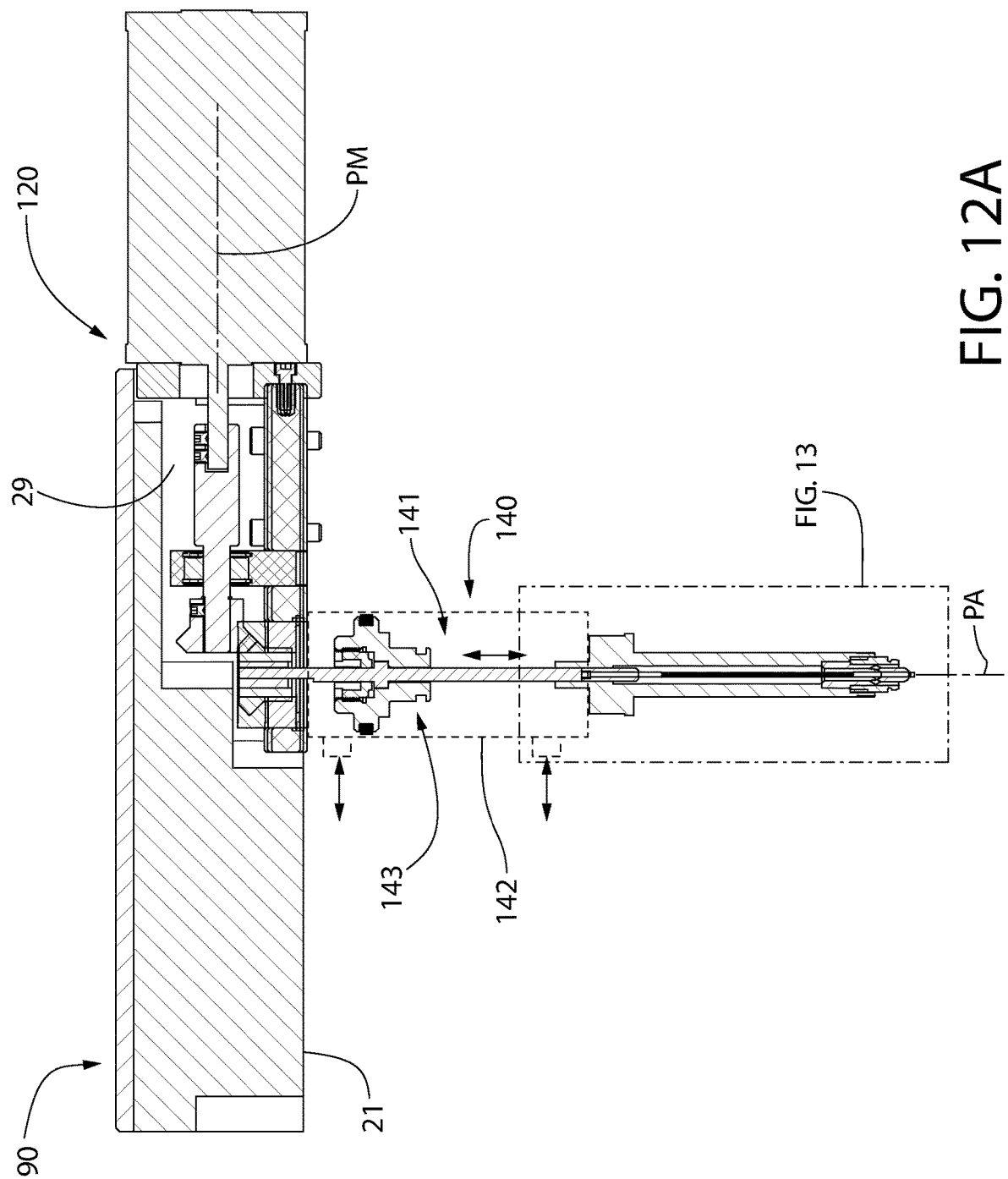
FIG. 12 A is a side cross-sectional view thereof.
FIG. 12B is an enlarged view taken from FIG. 12A showing the piston-operated valve pin actuating mechanism in greater detail.
Figure 12B:
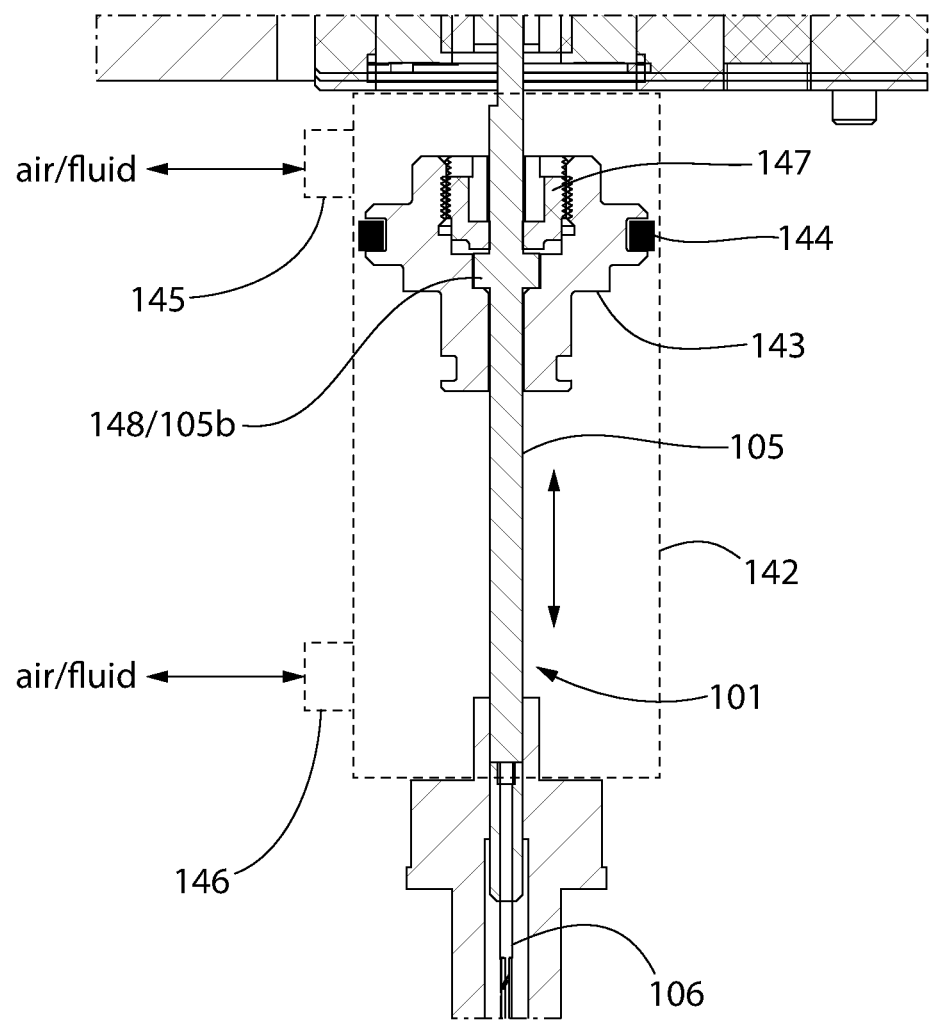
Figure 13:
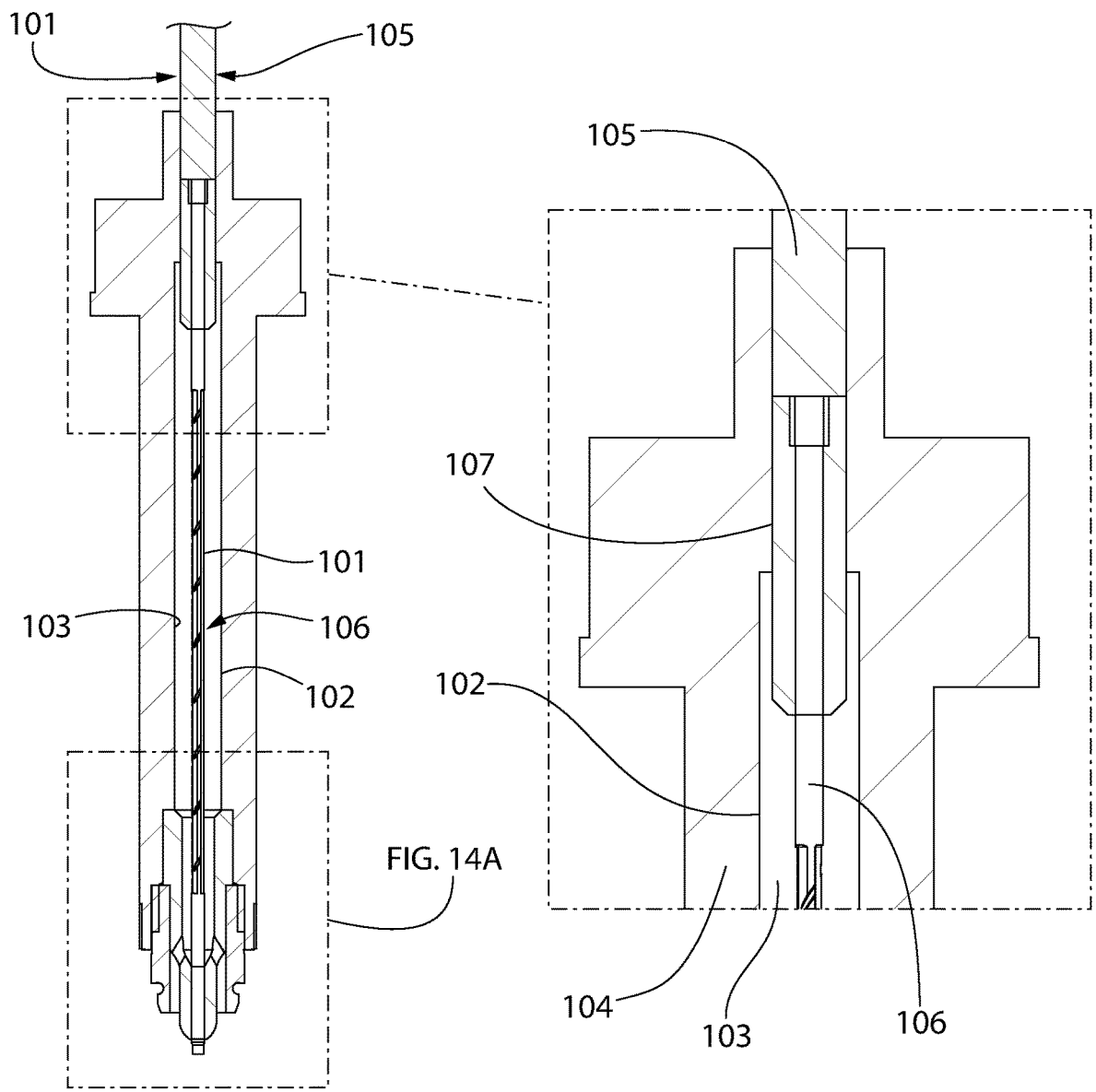
FIG. 13 is an enlarged detail taken from FIG. 12A.
Figure 14:
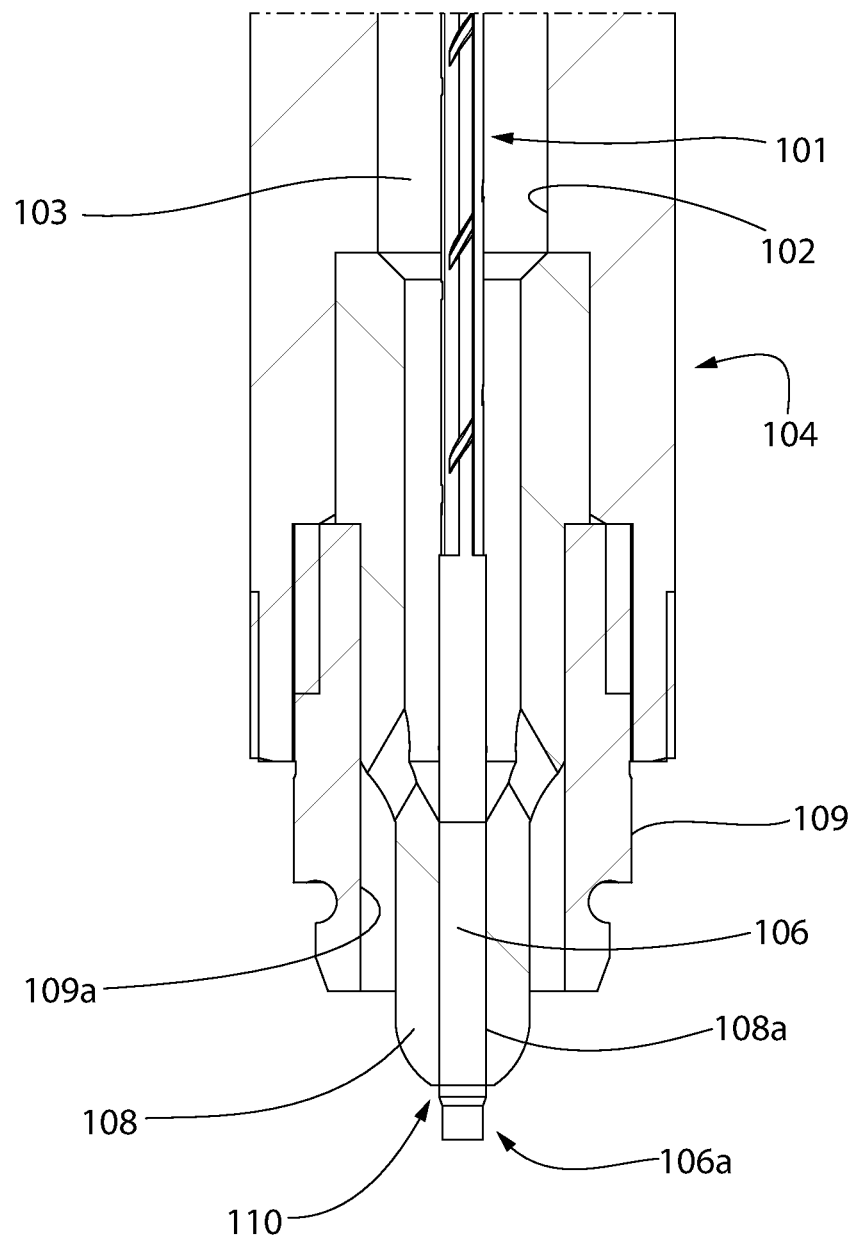
FIG. 14 is an enlarged detail taken from FIG. 13.
Figure 15:
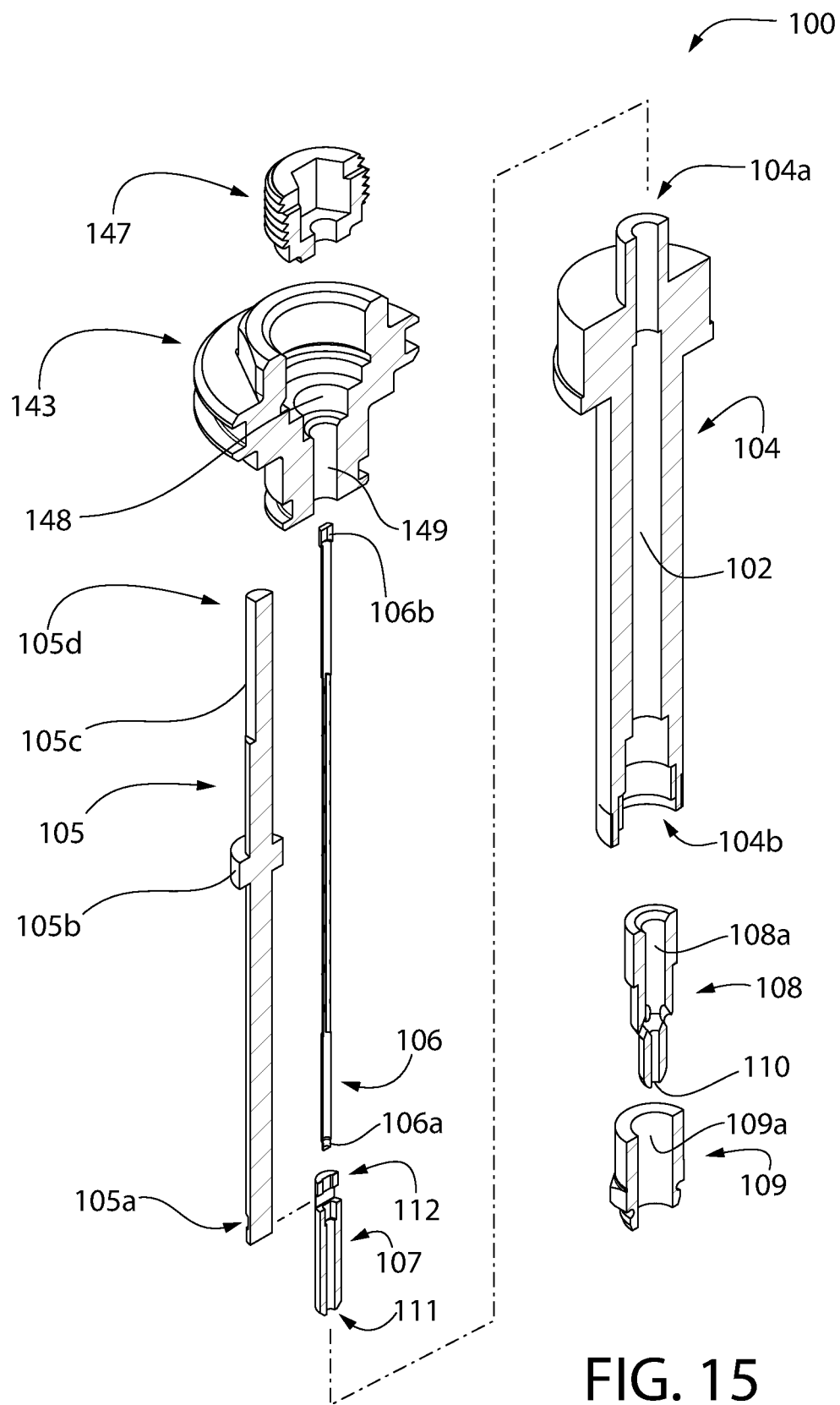
FIG. 15 is a top exploded perspective view of the injection nozzle assembly.
Figure 16:
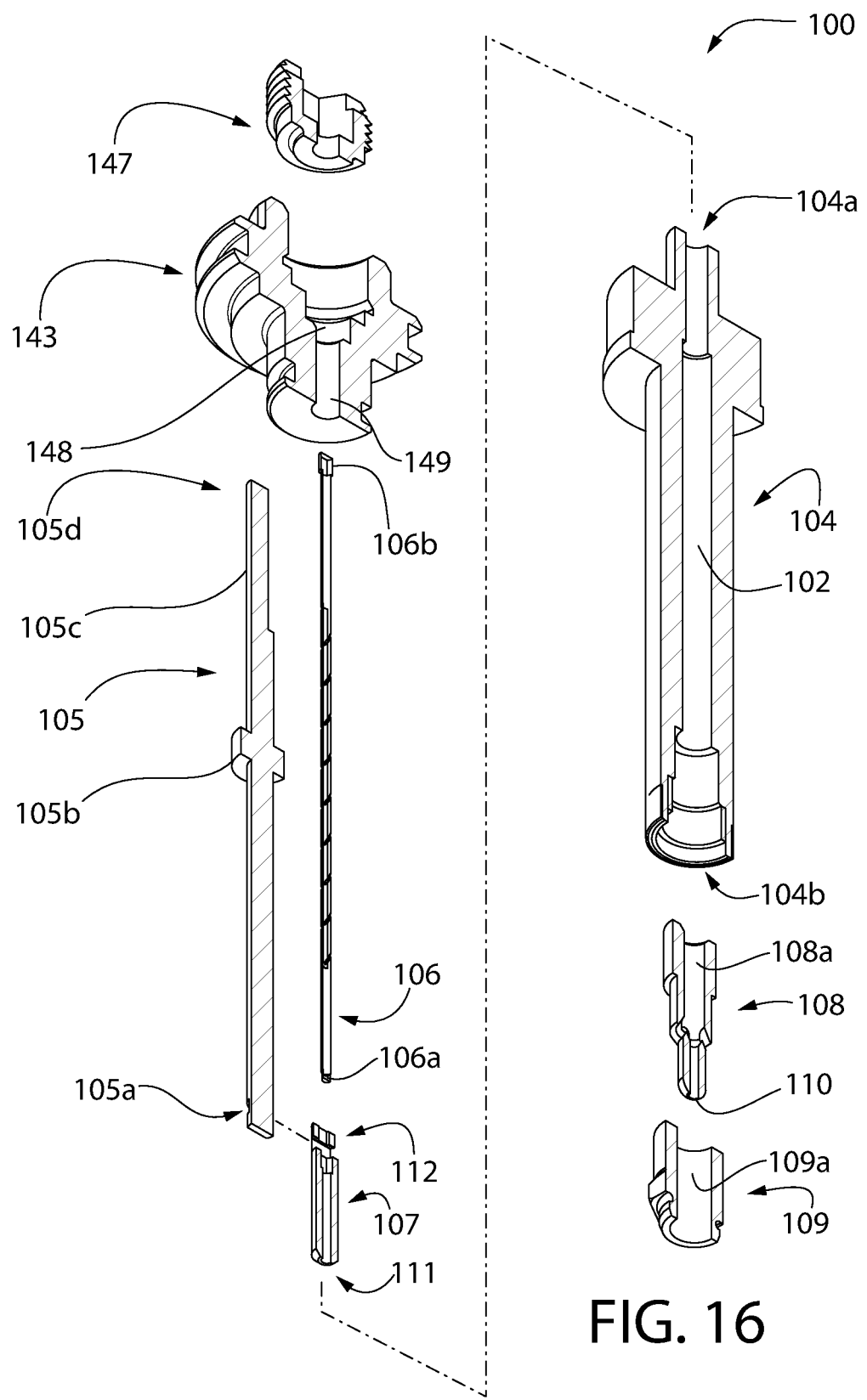
FIG. 16 is a bottom exploded perspective view of the injection nozzle assembly.
Figures 19, 20:
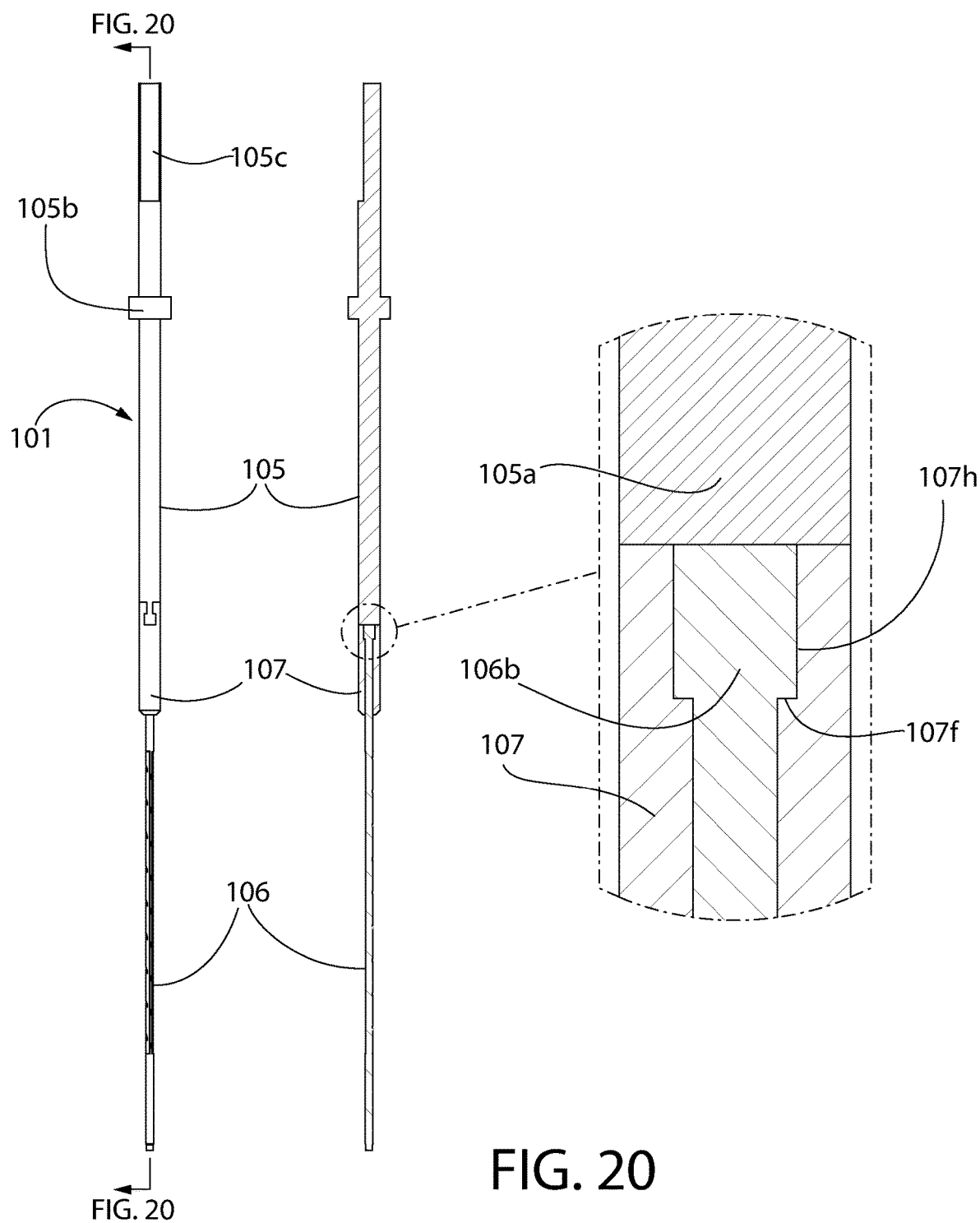
FIG. 19 is a second side view of the valve pin.
FIG. 20 is a side cross-sectional view therefrom.

To provide the linear motion to valve pin 101, actuating mechanism 140 in one embodiment may comprise a piston-operated pneumatic or hydraulic actuator 141 including a piston cylinder 142 and a piston 143 movably disposed in the cylinder and fixedly coupled to the valve pin 101 (see, e.g. FIGS. 12A-B). Cylinder 142 is shown schematically in these figures represented by dashed lines. In one preferred but non-limiting embodiment, an air-operated pneumatic actuator may be used. Piston 143 may be fixedly coupled to piston 143 by annular retention flange 105b formed on valve pin 101 (i.e. working pin member 105—see also FIG. 15). Flange 105b is trapped in a complementary configured pocket 148 of the piston by a threaded retention bushing 147 which is installed after the valve pin is passed through axial passage 149 of the piston until the flange becomes engaged and seated in the pocket. Passage 149 may have a diameter sized to allow the distal portion of operating pin member 105 and the entire working pin member 106 and coupler 107 to pass therethrough. This advantageously allows the 2-piece valve pin 101 to be fully assembled before mounting the pin to the piston 143 for convenience of assembly.

Any suitable type of pneumatic actuator 140 may be used including for example without limitation a double acting actuator as shown or a single acting actuator. The double acting actuator includes a proximal fluid connection or port 145 and distal fluid connection or port 146. A piston seal ring 144 seals the piston 143 to the inside walls of the cylinder 142.

In operation to shut off polymer melt flow into the mold cavity 27, pressurized air is introduced into the proximal end of cylinder 142 above the piston 143 via port 145 while air in the cylinder is exhausted/vented through the distal port. This forces the piston 143 and valve pin 101 downwards in a linear motion along the pin axis PA towards the mold cavity 27 to close the injection nozzle 100. The distal end 106a of the valve pin (i.e. working pin member 106) is projected through the discharge opening 110 of the nozzle 100.

Other embodiments may use a single acting pneumatic actuator having a single fluid port for moving the piston in one direction, and a spring-return to move the piston in the reverse direction. Such single acting pneumatic actuators are well known in the art. Any suitable commercially-available single or double acting actuator (or variations thereof) may be used.

To inject polymer melt into the mold cavity, the foregoing process is reversed. Pressurized air introduced below the piston 143 via the distal port 146 raises the piston and valve pin to open the injection nozzle 100. The distal end 106a of the valve pin (i.e. working pin member 106) is retracted inside discharge opening 110 of the nozzle 100, thereby opening the orifice to permit polymer to be injected into the mold cavity 27.

In other embodiments, an electrically-operated motorized lift may be coupled to the valve pin 101 in lieu of the pneumatic lift described above for raising and lowering the valve pin.

Polymer Cold Slug Prevention

The shear-inducing rotatable valve pin 101 and rotary drive mechanism previously described herein operates to create shear motion within the polymer injection nozzles 100 to beneficially control the spatial and temporal rheological state of the polymer being processed into molded products in a manner. The polymer is kept in a fluidic flowable state by imposition of shear force thereon which prevents or minimizes polymer cold slug formation. The viscosity of the polymer melt is kept below a maximum viscosity limit or value by the shear force which is associated with the onset of polymer solidification.

As previously described herein, injection molding is a manufacturing process in which molten material (usually polymer) is forced through a nozzle of an injection molding machine into a mold containing the desired product cavities.

The system of pathways in the mold that connects the nozzle to the product cavities is called the runner system. There are two types of injection molding system in use today.

Cold runner based injection molding systems are those in which the entire mold including the region containing the runner system is kept at a temperature below the material's melting temperature throughout the process. Once the product cavities are filled, the polymer material cools and eventually solidifies throughout the entire mold including the runner system. The desired products as well as solidified polymer in the shape of the runner system are then removed or ejected from the mold prior to the next manufacturing cycle. The molded articles are then separated from the solid runners.

With hot runner based injection molding as described previously herein, the runner portion of the mold assembly is heated continuously with the goal of keeping the material in the runner in a molten state at all times. If done appropriately, this leads to both material savings and a shorter cycle time compared to traditional cold runner injection molding.

The present injection molding system 90 with shear-inducing valve pin 100 described herein is amenable for use with either cold or hot runner type systems to avoid cold slug formation.

Figure 26A:
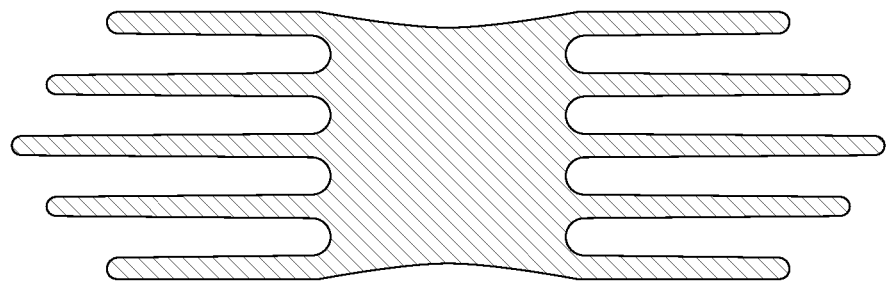
FIG. 26A shows an incompletely formed molded article resulting from polymer cold slug formation in the injection nozzle.

The injection nozzles 100 are most susceptible to polymer solidification and cold slug formation when the nozzles are in the closed position and not injecting polymer melt into the mold cavities 27. When closed, there is no flow of polymer through the nozzle. This stagnant state between mold cycles creates a greater potential for cold slug formation than when the polymer is flowing through the nozzle. The cold slug prevents filling the mold cavity completely resulting in a defective, partially formed molded article. FIG. 26 shows the results of incomplete mold cavity filling and the defective article produced which is waste (note partially formed peripheral ends of article). Conversely, FIG. 26B shows a perfectly formed same article produced by fully filling the mold cavity using the shear-inducing valve pin 100 in injection nozzle 100 according to the present disclosure.

Figure 26B:
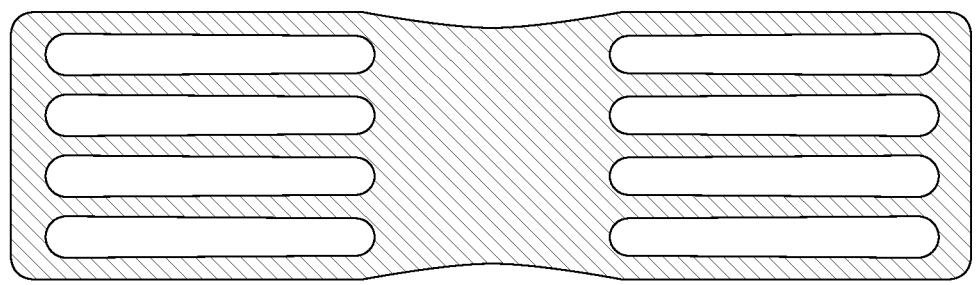
FIG. 26B shows a completely formed molded article resulting from the shear-inducing molding system according to the present disclosure.
Figure 27A:
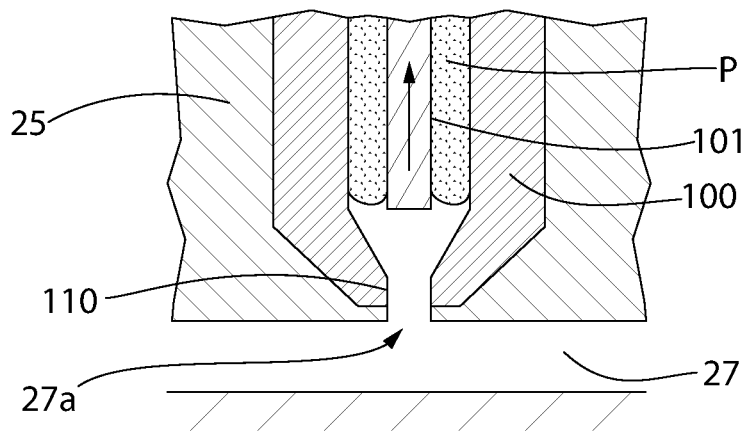
FIG. 27A is a partial cross-sectional view showing the polymer injection nozzle in an open position with its associated valve pin a retracted position.
Figure 27B:
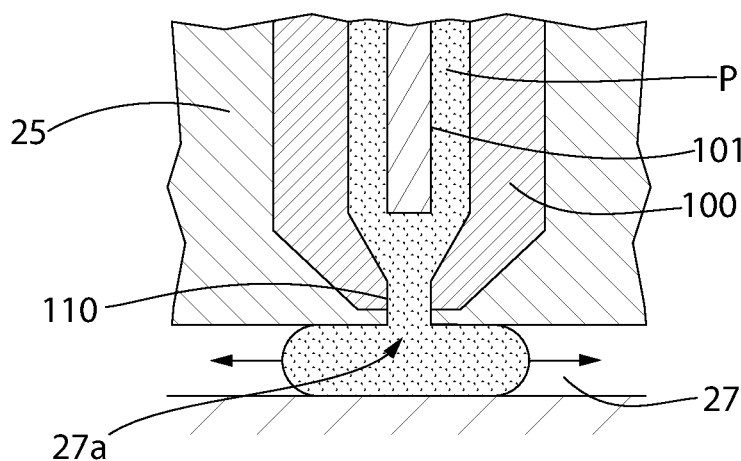
FIG. 27B is a partial cross-sectional view thereof showing the polymer flowing into the mold cavity.
Figure 27C:
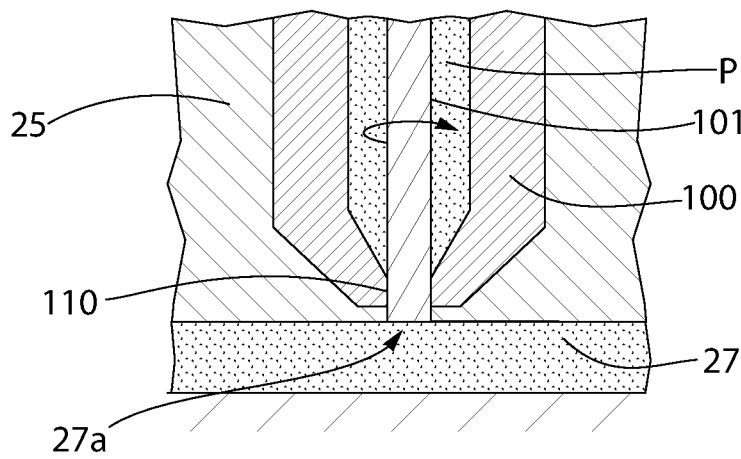
FIG. 27C is a partial cross-sectional view showing the injection nozzle linearly moved to a closed position with the valve pin in a projected position and the valve pin being rotated to induce shear on the polymer.

A process or method for operating injection molding system 90 to prevent polymer cold slug formation which can yield the foregoing fully formed article in FIG. 26B will now be briefly summarized. The shear-inducing injection molding system 90 in one embodiment described below applies a controllable rate of shear to the polymer melt in the injection nozzle 100 between injection molding cycles. In other embodiments, shear may be imparted to the polymer both during and between injection cycles (i.e. nozzle in open and closed positions) if polymer cold slug formation is problematic even when flow occurs through the nozzle. FIGS. 27A-C are simplified schematic images summarizing the method/process.

The method includes fluidly coupling at least one injection nozzle 100 to a mold cavity 27. The nozzle is initially in the closed position and valve pin 101 is in the projected position which seals off the discharge opening 110 of the nozzle, as previously described herein. Actuating mechanism 140 is actuated to raise the valve pin to the retracted position (FIG. 27A). This opens the nozzle discharge opening thereby allowing polymer to be injected into and fill the mold cavity 27 (FIG. 27B). Once cavity 27 is filled, the injection nozzle 100 is closed by now operating the actuating mechanism to lower and return valve pin 101 to the projected position and seal off nozzle discharge opening 110 (FIG. 27C). After this step or alternatively concurrently therewith, rotary drive mechanism 120 is actuated to rotate the valve pin 101. In either acceptable operating scheme, this imparts a shear force on the stagnant column of polymer trapped in the nozzle 100, thereby advantageously lowering or maintaining its viscosity at a level below the maximum viscosity level or limit associated with the onset of polymer solidification and cold slug formation without the application of heat to the nozzle in some embodiments. In certain embodiments, as previously described herein, the shearing action may instead augment heating provided for the injection nozzle 100. Preferably, the rotary drive mechanism 120 is operated to rotate the shear-inducing valve pin 101 continuously while the injection nozzle is in the closed "no flow" position. Rotation of the valve pin may be stopped once the nozzle changes returns to the open position for the next polymer injection cycle.

Figure 28:
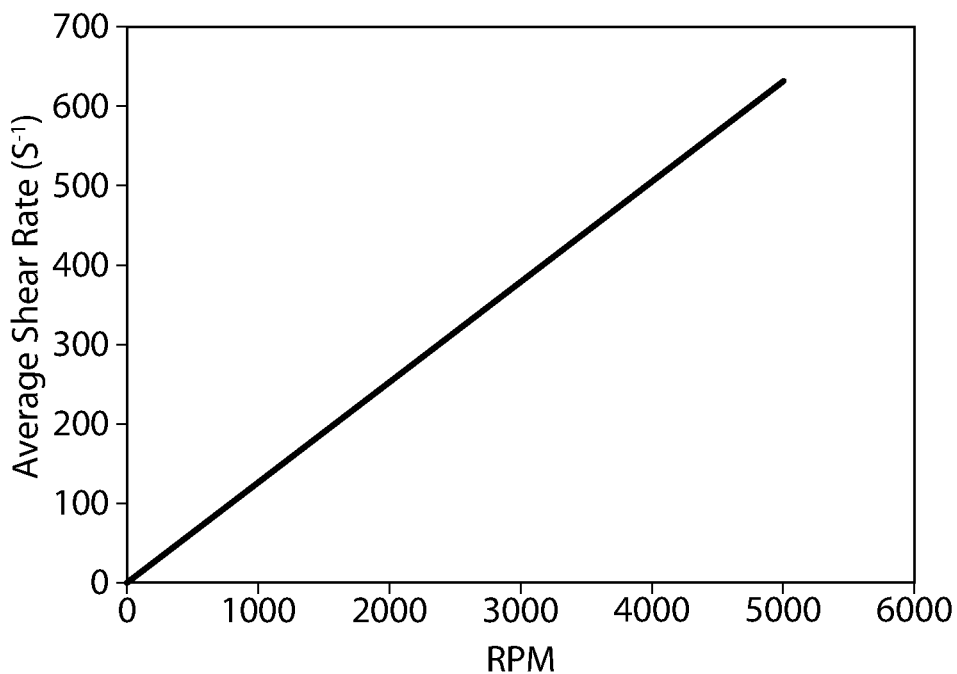
FIG. 28 is a graph showing the relation between the average shear rate versus RPM (revolutions per minute) of the nozzle valve pin.

FIG. 28 is a graph showing the relation between the average shear rate versus RPM (revolutions per minute) of the nozzle valve pin 101. As noted, increasing the rotational speed concomitantly results in an increase in shear rate applied to the polymer.

Figure 29:
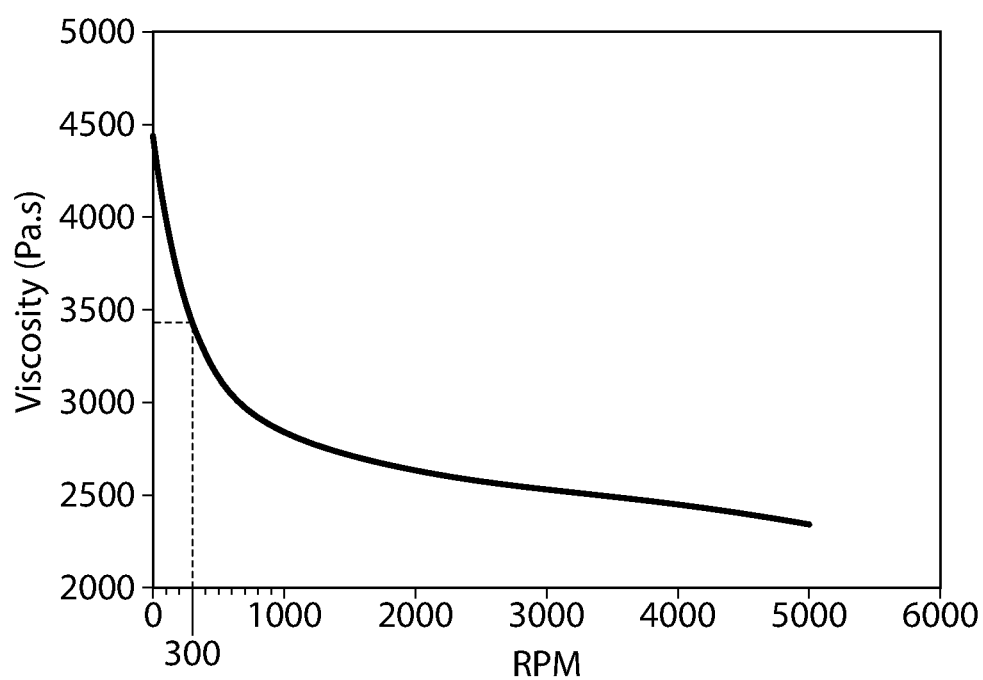
FIG. 29 is a graph showing the relation between viscosity of the polymer versus RPM of nozzle valve pin.

FIG. 29 is a graph showing the relation between viscosity of the polymer versus RPM of nozzle valve pin 101. As noted, there is a rapid decrease in viscosity achieved by rotating the pin from 0 RPM up to about 500 RPM. Further benefit and reduction in viscosity rapidly declines from this point moving towards greater rotational speeds. Accordingly, a significant decrease in viscosity and prevention of polymer cold slug formation in injection nozzle 100 is achievable even at a relatively modest rotational speeds of 500 RPM.

Figure 30A:
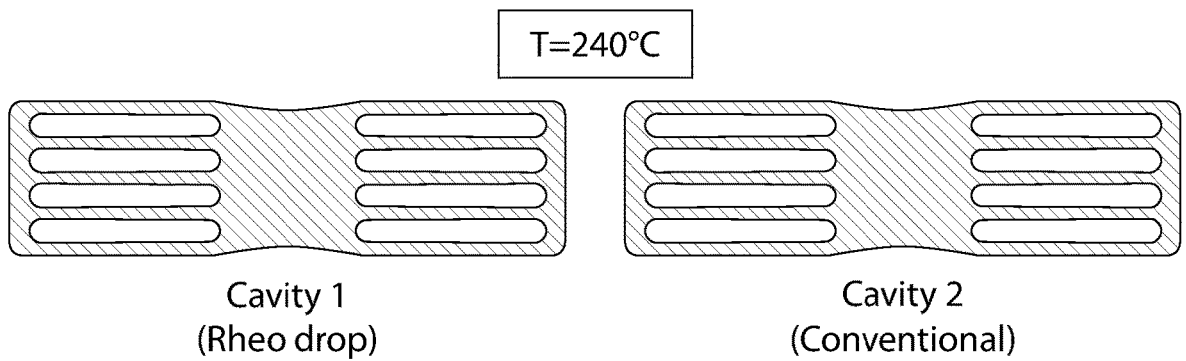
FIG. 30A shows the results of a comparison between a molded article formed using the shear-inducing rotational valve pin Rheo drop technique according to the present disclosure versus the same molded article formed using a conventional molding process with non-rotating valve pin, conducted at a first polymer temperature.
Figure 30B:
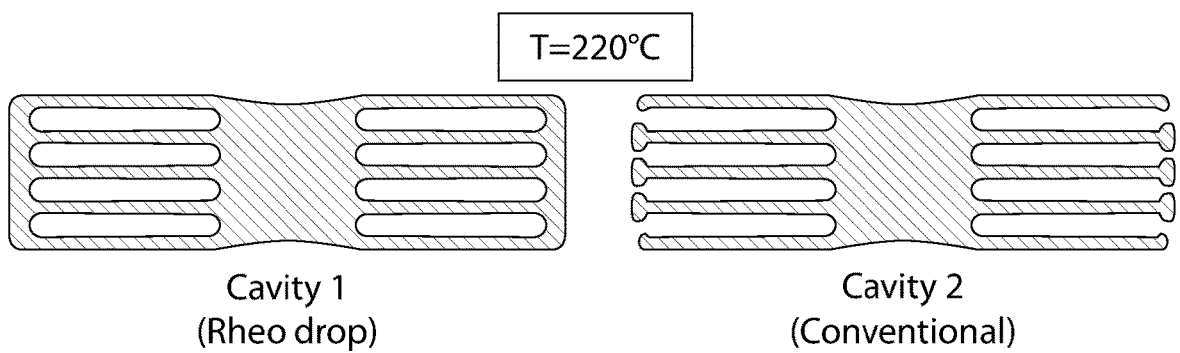
FIG. 30B shows the results of a comparison between a molded article formed using the shear-inducing rotational valve pin Rheo drop technique according to the present disclosure versus the same molded article formed using a conventional molding process with non-rotating valve pin, conducted at a second polymer temperature.
Figure 30C:
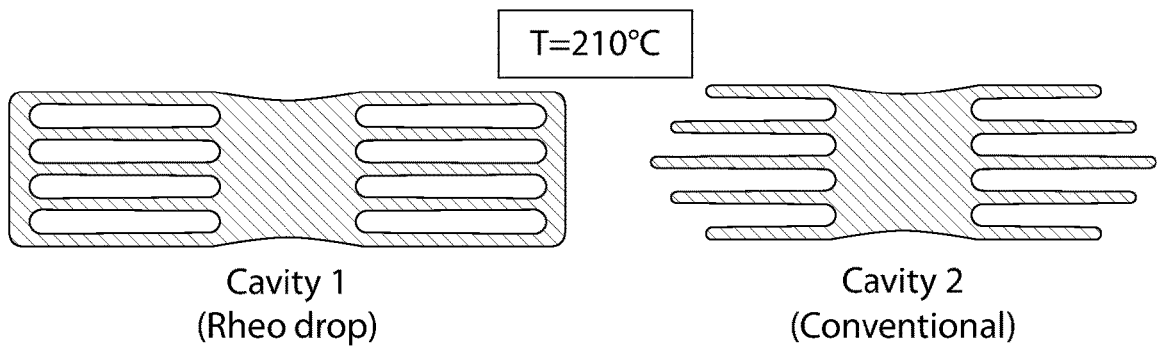
FIG. 30C shows the results of a comparison between a molded article formed using the shear-inducing rotational valve pin Rheo drop technique according to the present disclosure versus the same molded article formed using a conventional molding process with non-rotating valve pin, conducted at a third polymer temperature.

FIGS. 30A-C summarizes the results of a hot runner experimental investigation comparing the use of conventional polymer injection nozzle heating with the shear-inducing injection molding system rotating valve pin 101. The present shear-inducing approach is arbitrarily referred to in the figures for convenience as "Rheo drop." The molding process was conducted at the different polymer melt temperatures noted in the figures. The polymer tested in this example was acrylonitrile butadience styrene (ABS).

At the highest experimental melt temperature (240 degrees C.), both conventional and Rheo drop produced fully formed and acceptable molded articles. At the lower melt temperatures of 210 and 220 degrees C., incomplete articles were molded using the convention heated nozzle approach with significantly more defects occurring as the melt temperature drops. This may be attributed to solidification and cold slug formation in the injection nozzle. By stark contrast, however, the Rheo drop process yielded fully formed articles at these lower polymer melt temperatures. Accordingly, it is possible to prevent cold slug formation and/or insufficient flow due to high viscosity levels. As shown it is also possible to produce fully formed articles at lower melt temperatures which can prevent undesired material degradation and advantageously results in energy savings.

While the foregoing description and drawings represent some example systems, it will be understood that various additions, modifications, and substitutions may be made therein without departing from the spirit and scope and range of equivalents of the accompanying claims. In particular, it will be clear to those skilled in the art that the present invention may be embodied in other forms, structures, arrangements, proportions, sizes, and with other elements, materials, and components, without departing from the spirit or essential characteristics thereof. In addition, numerous variations in the methods/processes described herein may be made. One skilled in the art will further appreciate that the invention may be used with many modifications of structure, arrangement, proportions, sizes, materials, and components and otherwise, used in the practice of the invention, which are particularly adapted to specific environments and operative requirements without departing from the principles of the present invention. The presently disclosed embodiments are therefore to be considered in all respects as illustrative and not restrictive, the scope of the invention being defined by the appended claims and equivalents thereof, and not limited to the foregoing description or embodiments. Rather, the appended claims should be construed broadly, to include other variants and embodiments of the invention, which may be made by those skilled in the art without departing from the scope and range of equivalents of the invention.

What is claimed is:

1. A polymer injection molding system comprising:
   a manifold comprising a plurality of internal flow conduits configured for conveying polymer in a fluidic state;
   an injection nozzle fluidly coupled to the flow conduits, the injection nozzle configured to interface with a mold cavity and changeable between open and closed positions;
   the injection nozzle comprising a tubular valve body defining a pin axis, a central axial passage extending along the pin axis and configured to dispense polymer into the mold cavity, and an elongated valve pin movably disposed in the central axial passage;
   wherein the valve pin is rotatably movable and configured to induce shear on the polymer;
   wherein the valve pin is continuously rotatable when the injection nozzle is in the closed position to prevent polymer cold slug formation.

2. The system according to claim 1, further comprising a rotary drive mechanism coupled to the valve pin and operable to rotate the valve pin.

3. The system according to claim 2, wherein the valve pin is continuously rotatable when the injection nozzle is in the fully open position to enhance localized melt properties and process balancing.

4. The system according to claim 1, wherein the valve pin is further axially translatable between a retracted position associated with the open position of the injection nozzle, and a projected position associated with the closed position of the injection nozzle, and wherein the valve pin is rotatable without axially translating the valve pin.

5. The system according to claim 4, wherein the injection nozzle comprises a discharge orifice, the valve pin being movable into and out of the discharge orifice when the valve pin changes between the projected and retracted positions respectively.

6. The system according to claim 4, wherein the rotary drive mechanism comprises an electric motor and a gear assembly operably coupled between the motor and the valve pin to rotate the valve pin.

7. The system according to claim 6, wherein the gear assembly comprises a drive gear coupled to the motor and a driven gear coupled to the valve pin.

8. The system according to claim 7, wherein the driven gear comprises a keyhole and the valve pin includes an extension key slideably movable through the keyhole when the valve pin moves between the retracted and projected positions.

9. The system according to claim 8, wherein the keyhole and extension key have complementary configured non-circular cross-sectional shapes.

10. The system according to claim 4, further comprising an actuating mechanism configured and operable to change the valve pin between the retracted and projected positions.

11. The system according to claim 10, wherein the actuating mechanism comprises a pneumatic or hydraulic piston assembly including a piston cylinder and a piston movably disposed in the piston cylinder and fixedly coupled to the valve pin.

12. The system according to claim 11, wherein linearly moving the piston in the piston cylinder moves the valve pin.

13. The system according to claim 2, wherein the injection nozzle and drive mechanism are supported by a baseplate configured for mounting to the hot runner manifold.

14. The system according to claim 1, wherein the injection nozzle is heated.

15. The system according to claim 1, wherein the valve pin comprises an elongated proximal working pin member, an elongated distal operating pin member, and a coupler detachably coupling the working and operating pin members together.

16. The system according to claim 15, wherein the operating pin member is keyed to the coupler.

17. An injection nozzle assembly for a polymer molding system comprising:
   an injection nozzle configured to receive polymer in a fluidic state, the injection nozzle configured to interface with a mold cavity and changeable between open and closed positions;
   the injection nozzle comprising a tubular valve body defining a pin axis, a central axial passage extending along the pin axis and configured to dispense polymer into the mold cavity, and an elongated valve pin movably disposed in the central axial passage;
   the valve pin being axially translatable between a projected position when the injection nozzle is in the closed position, and a retracted position when the injection nozzle is in the open position; and
   the valve pin further being continuously rotatably movable and operable to induce shear on the polymer when the injection nozzle is in the closed and open positions.

18. The injection nozzle according to claim 17, wherein the valve pin protrudes outwards through and seals a discharge opening of the nozzle in the projected position, and wherein the valve pin is withdrawn from the discharge opening in the retracted position.

19. The injection nozzle according to claim 17, wherein the valve pin is rotated at a speed selected to prevent a viscosity of the fluidic polymer from exceeding a predetermined maximum viscosity limit associated with the onset of solidification of the polymer.

20. The injection nozzle according to claim 17, wherein the injection nozzle is heated.

* * * * *